(12) United States Patent
Saito et al.

(10) Patent No.: US 12,443,024 B2
(45) Date of Patent: Oct. 14, 2025

(54) OPTICAL SIGNAL DETECTION DEVICE, GEL UNIT, AND METHOD FOR MANUFACTURING GEL UNIT

(71) Applicant: Evident Corporation, Tatsuno-machi (JP)

(72) Inventors: Yoshiharu Saito, Nagano (JP); Kengo Osawa, Nagano (JP); Daisuke Nishiwaki, Nagano (JP)

(73) Assignee: Evident Corporation, Nagano (JP)

( * ) Notice: Subject to any disclaimer, the term of this patent is extended or adjusted under 35 U.S.C. 154(b) by 399 days.

(21) Appl. No.: 18/116,786

(22) Filed: Mar. 2, 2023

(65) Prior Publication Data
US 2023/0296874 A1 Sep. 21, 2023

(30) Foreign Application Priority Data

Mar. 15, 2022 (JP) .................. 2022-040475
Dec. 15, 2022 (JP) .................. 2022-200074

(51) Int. Cl.
| | |
|---|---|
| *G02B 21/33* | (2006.01) |
| *G02B 21/02* | (2006.01) |
| *G02B 21/24* | (2006.01) |
| *G02B 21/06* | (2006.01) |

(52) U.S. Cl.
CPC ............ *G02B 21/33* (2013.01); *G02B 21/02* (2013.01); *G02B 21/24* (2013.01); *G02B 21/06* (2013.01); *G02B 2207/109* (2013.01)

(58) Field of Classification Search
CPC ........ G02B 21/33; G02B 21/02; G02B 21/24; G02B 21/06; G02B 2207/109

USPC ........................................ 359/656
See application file for complete search history.

(56) References Cited

U.S. PATENT DOCUMENTS

2017/0017070 A1  1/2017  Suzuki

FOREIGN PATENT DOCUMENTS

| JP | 2005345726 A | * | 12/2005 |
|---|---|---|---|
| JP | 2017026666 A | | 2/2017 |

OTHER PUBLICATIONS

JP 2005345726 A (Year: 2005).*

* cited by examiner

*Primary Examiner* — William Choi
(74) *Attorney, Agent, or Firm* — Holtz, Holtz & Volek PC

(57) ABSTRACT

An optical signal detection device includes an objective and a gel unit including a gel and an assisting member. The assisting member includes a first surface, a second surface, and an opening. The opening has a diameter smaller than an outer diameter of the gel and larger than an effective diameter of the objective. The first surface faces the gel, and a part of the first surface is fixed to a bottom surface of the gel by an adhesive force. A center of the bottom surface is not in contact with the assisting member. In a state where the gel unit is attached to a frame member of the objective, the second surface faces the frame member of the objective, a part of the first surface is fixed to the gel outside the effective diameter of the objective, and the gel is in close contact with the objective.

21 Claims, 27 Drawing Sheets

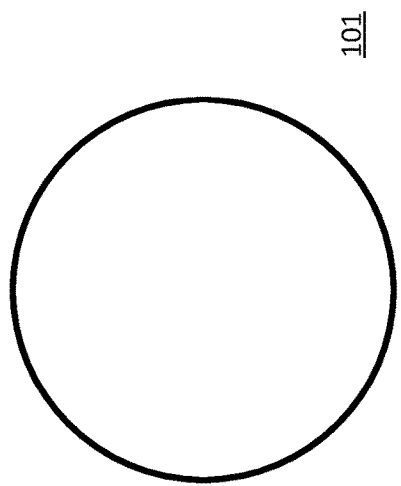
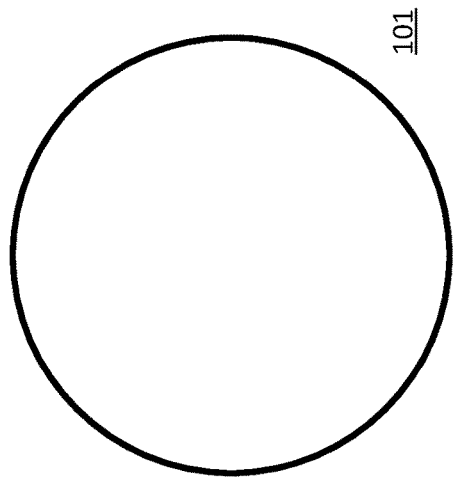
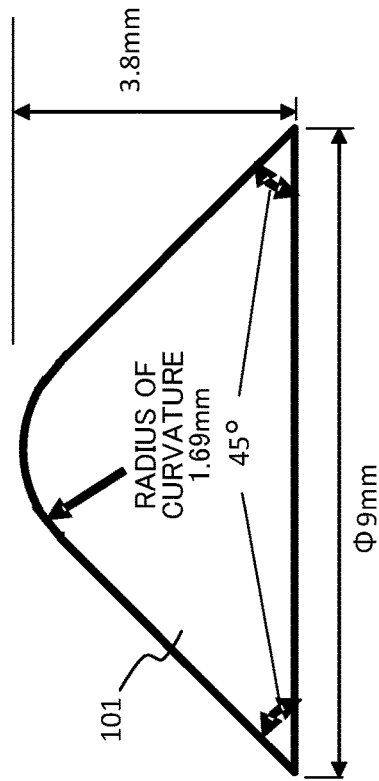
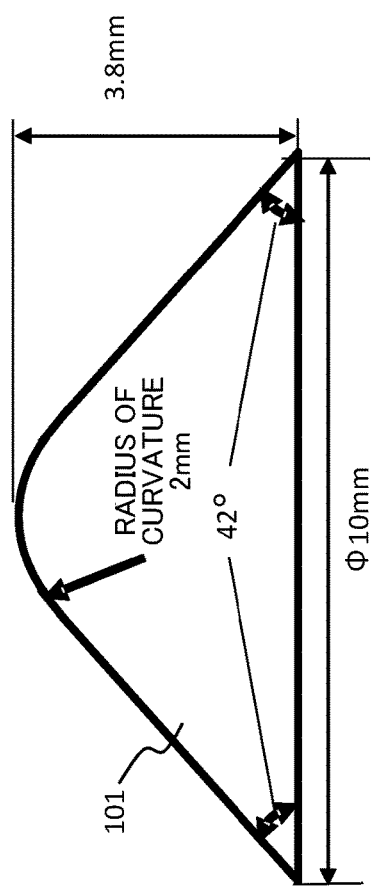
Fig. 1A
Fig. 1B

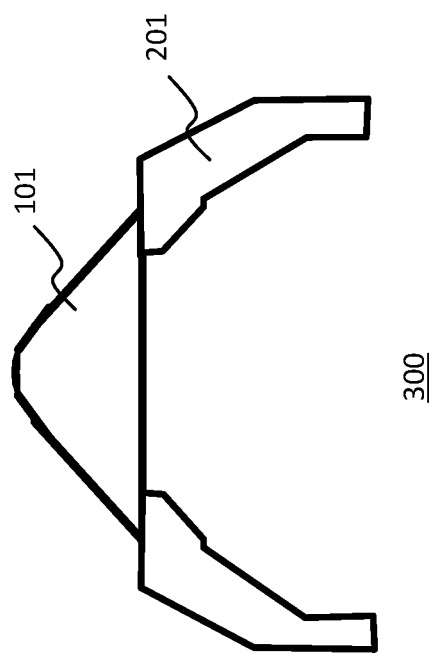
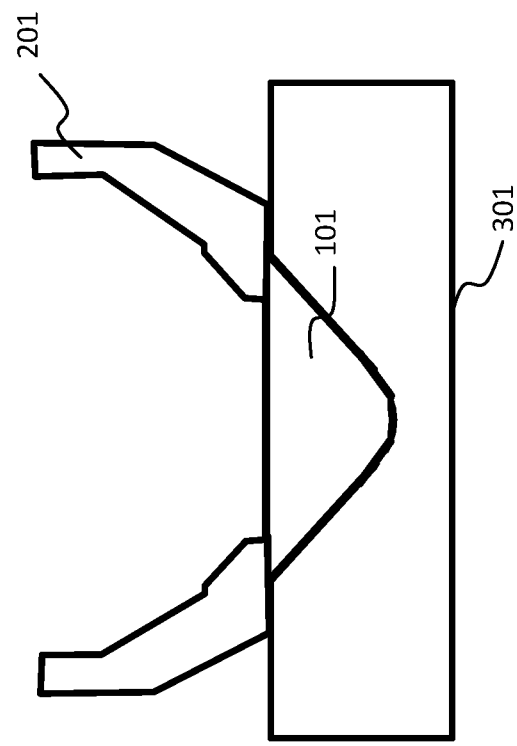
Fig. 3A
Fig. 3B

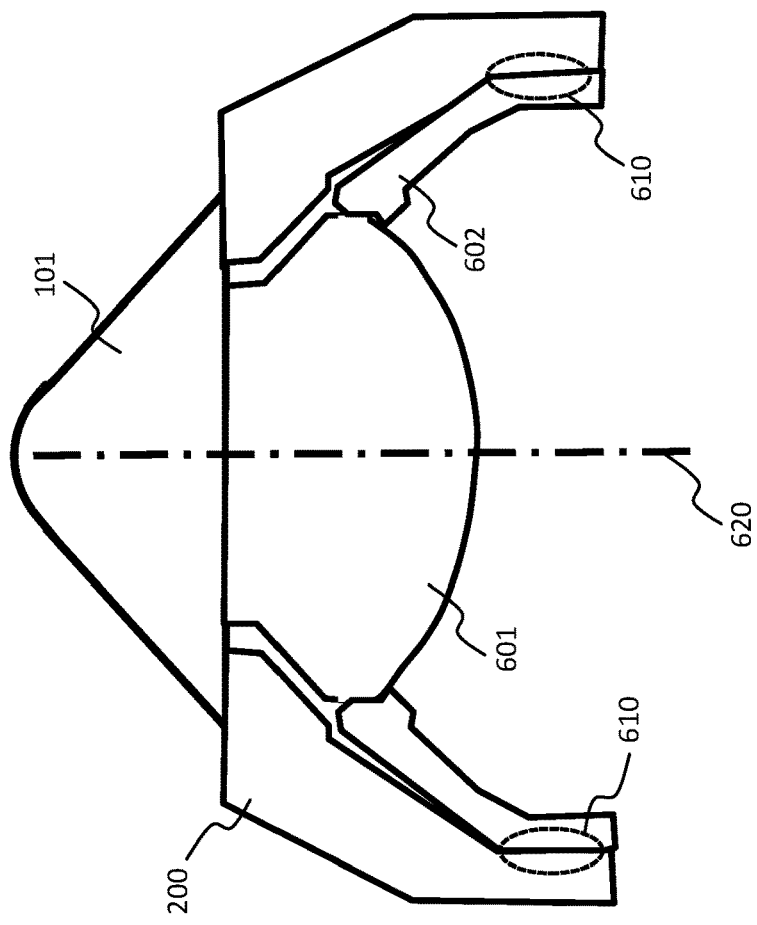
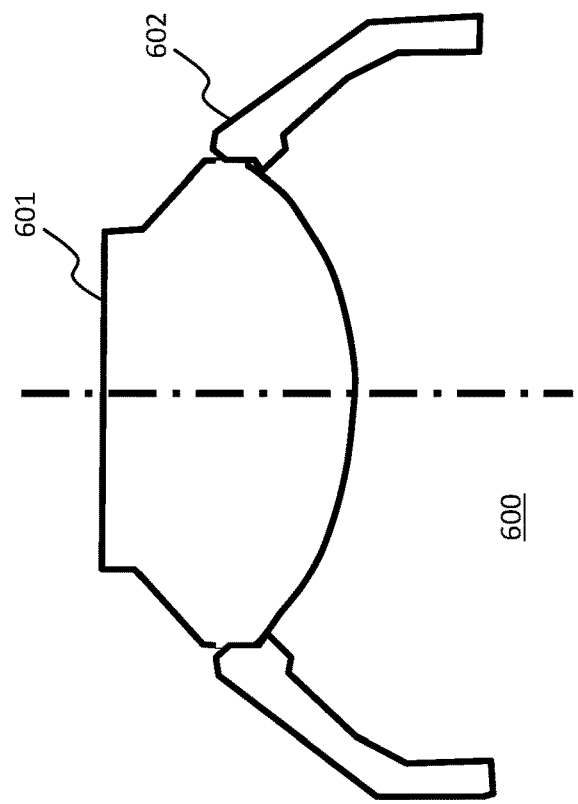
Fig. 6B
Fig. 6A

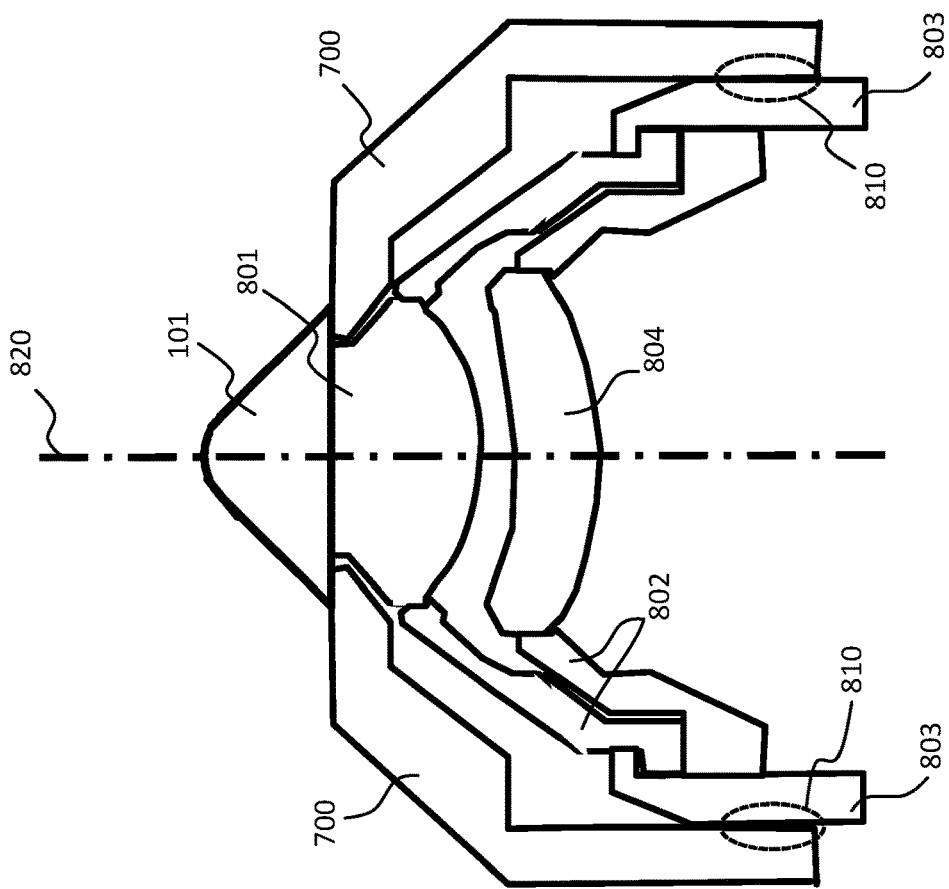
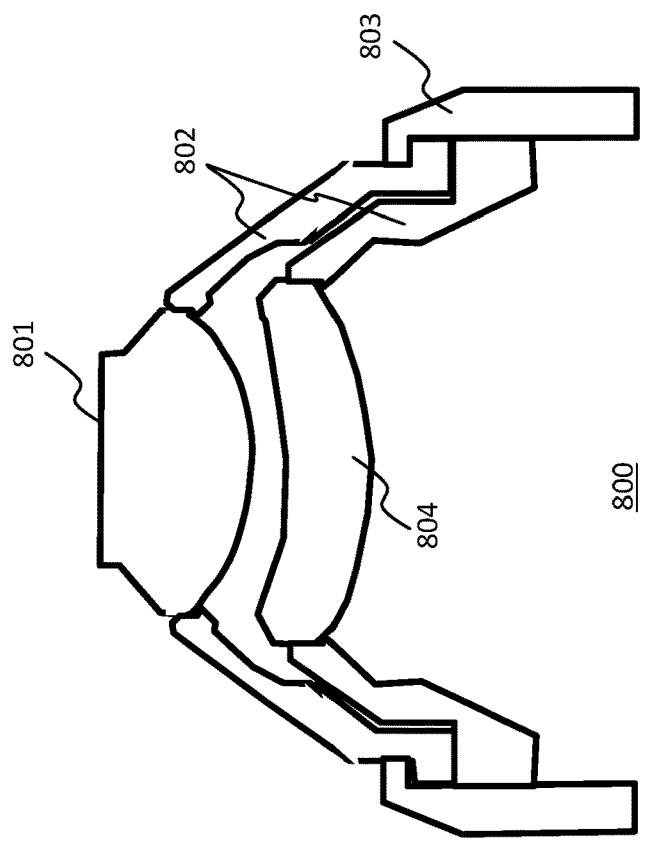
Fig. 8B
Fig. 8A

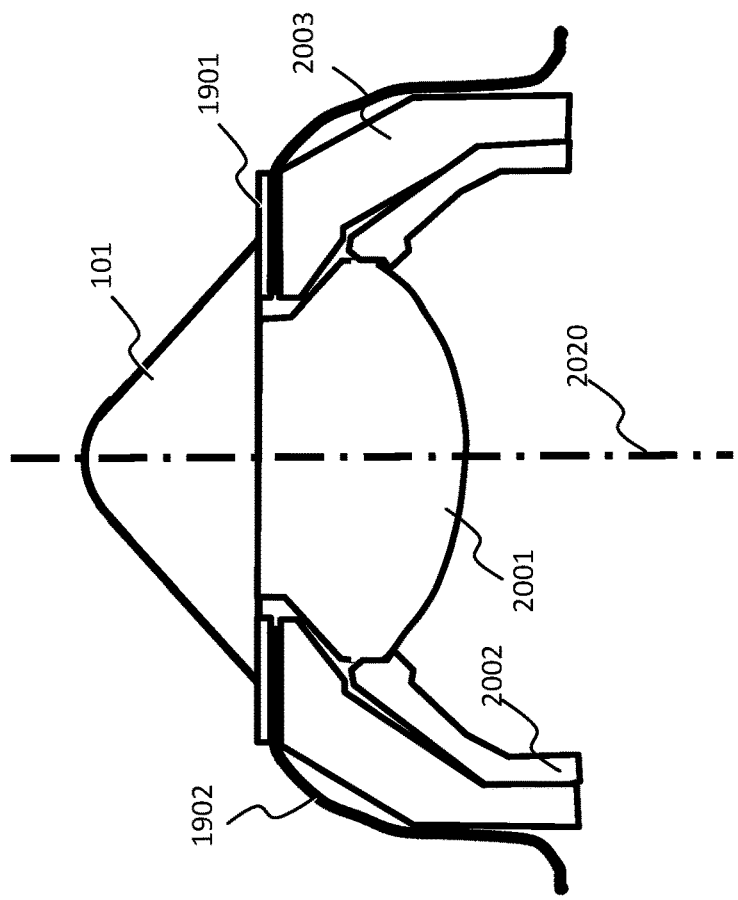
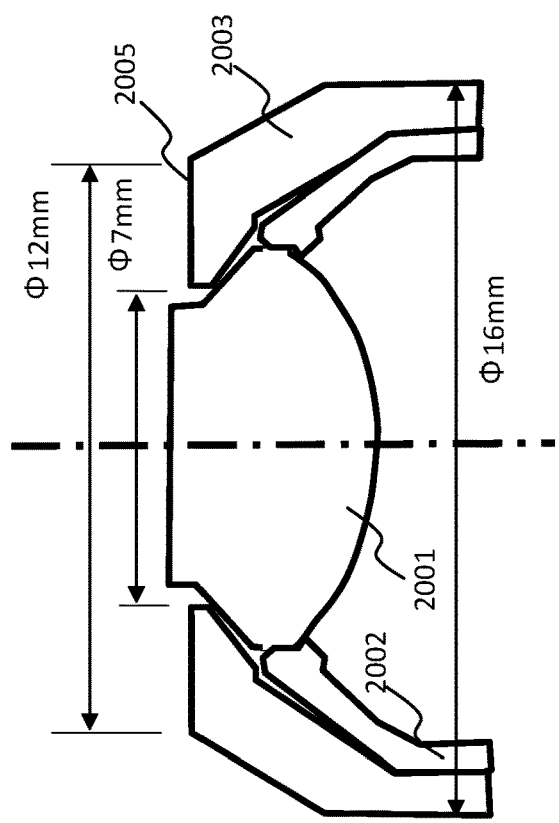
Fig. 20B
Fig. 20A

OPTICAL SIGNAL DETECTION DEVICE, GEL UNIT, AND METHOD FOR MANUFACTURING GEL UNIT

CROSS REFERENCE TO RELATED APPLICATIONS

This application is based upon and claims the benefit of priority from prior Japanese Patent Applications No. 2022-040475, filed Mar. 15, 2022 and No. 2022-200074, filed Dec. 15, 2022, the entire contents of which are incorporated herein by this reference.

TECHNICAL FIELD

The present invention relates to an optical signal detection device, a gel unit, and a method for manufacturing the gel unit.

BACKGROUND

In recent years, studies using cell aggregates such as spheroids and organoids obtained by collecting and three-dimensionally culturing a large number of cells have attracted attention. Such a sample has a size of, for example, about 100 µm to 500 µm.

In deep cell observation of such a sample, an immersion objective is generally used. The immersion objective can have a higher numerical aperture than that of a dry objective when the space between the objective and the sample (more specifically, a holding member holding the sample) is filled with an immersion liquid.

By using the immersion liquid having a refractive index close to the refractive index of the sample, it is also possible to suppress spherical aberration caused by a refractive index mismatch occurring at the interface between the sample and the immersion liquid (air in the case of a dry objective). As described in JP-A-2017-026666 A and the like, the effect of the spherical aberration caused by the refractive index mismatch becomes more pronounced as the observation position becomes deeper, so that it is possible to observe up to a deeper position by suppressing the spherical aberration.

SUMMARY

A gel unit for attachment to an objective included in an optical signal detection device according to one aspect of the present invention includes a gel and an assisting member, the assisting member includes a first surface and an opening, the opening has a diameter smaller than an outer diameter of the gel, the first surface faces the gel, a part of the first surface is fixed to a bottom surface of the gel by an adhesive force, and a center of the bottom surface is not in contact with the assisting member.

BRIEF DESCRIPTION OF DRAWINGS

The present invention will be more apparent from the following detailed description when the accompanying drawings are referenced.

FIGS. 1A and 1B are diagrams illustrating exemplary gels according to an embodiment;

FIGS. 3A and 3B are diagrams illustrating attachment of a gel to the assisting member according to the embodiment;

FIGS. 6A and 6B are diagrams illustrating attachment of the assisting member to a tip lens frame of an objective according to the embodiment;

FIGS. 8A and 8B are diagrams illustrating attachment of the assisting member to a tip lens frame of an objective according to the embodiment;

FIGS. 20A and 20B are diagrams illustrating attachment of the assisting member to an objective according to the embodiment;

DESCRIPTION OF EMBODIMENTS

Figure 2B:
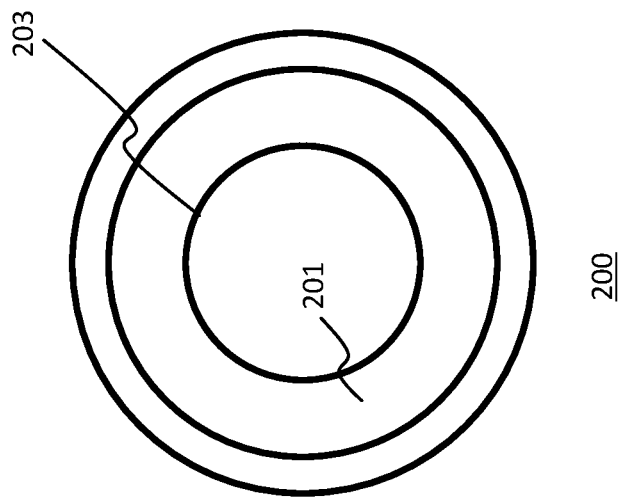
FIGS. 2A and 2B are diagrams illustrating an assisting member for covering an objective according to the embodiment.

In a case where liquid immersion is used, a user may be forced to bear the burden of maintenance, operation, and the like. Therefore, it is conceivable to use gel immersion that is easy to handle. For example, in order to attach a gel to an objective, a method of directly touching the gel with tweezers or the like to attach the gel can be considered. However, the gel may be hardly detached from the tweezers, and may be damaged during handling. Therefore, it is desired to provide a technique capable of suppressing damage of the gel and the like and easily attaching the gel to the objective.

Some embodiments of the present invention will be described below with reference to the drawings. In the drawings, corresponding components are denoted by the same reference numerals.

As described above, in a case where liquid immersion is used, a user may be forced to bear the burden of maintenance, operation, and the like.

For example, in actual observation, a dry objective and an immersion objective may be switched and used in the middle of observation. For example, a typical example of the use is that a region of interest is first found using a dry objective having a relatively low magnification and a wide field of view, and then the region of interest is observed in detail using an immersion objective having a high resolving power.

However, in order to switch the dry objective to the immersion objective, it is necessary to newly supply an immersion liquid to fill a space between the immersion objective and a sample with the immersion liquid. In addition, in order to switch the immersion objective to the dry objective, it is necessary to reliably wipe off the immersion liquid so that the immersion liquid does not remain on the surface of the sample. As described above, in the switching between the dry objective and the immersion objective, various operations are additionally required other than the operation of switching between the objectives themselves. Therefore, the observation is temporarily interrupted, and it is difficult to smoothly perform the observation.

In addition, also in the case of observing the sample only with the immersion objective, there are various problems as compared with the case of using the dry objective. For example, in a case where water is used as the immersion liquid, the immersion liquid evaporates when observation is continued for a long time. Therefore, it is necessary to appropriately supply the immersion liquid during the observation. In addition, when oil is used as the immersion liquid, there are problems that cleaning takes time and effort, bubbles are easily generated due to high viscosity, and the like. Furthermore, when an objective having a long working distance is used in an inverted microscope, it is difficult to maintain an immersion liquid between the objective and the sample by surface tension. Even in the case of observing the sample from an oblique direction or a lateral direction, it is difficult to maintain the immersion liquid by surface tension, and in that respect, there is a problem similar to that in the case of using an objective with a long working distance. For this reason, in these cases, a large-scale mechanism for maintaining the immersion liquid between the objective and the sample is required. In addition, when observation is performed over a wide range in the depth direction, the distance between the objective and the sample greatly changes during the observation, and thus there is also a problem that the immersion liquid easily spills from between the objective and the sample.

As described above, in the present situation, in the case of using the immersion objective, a greater burden is imposed on the user than in the case of using the dry objective.

Therefore, it is conceivable to use gel immersion that is easy to handle. For example, in order to attach a gel to an objective, a method of directly touching the gel with tweezers or the like to attach the gel can be considered. However, the gel may be hardly detached from the tweezers, and may be damaged during handling. Therefore, it is desired to provide a technique capable of suppressing damage of the gel and the like and easily attaching the gel to the objective.

Therefore, in each of the embodiments described below, a gel is attached to an objective using an assisting member brought into close contact with the gel. Since the gel is handled using the assisting member, handling is facilitated, and damage to the gel can also be suppressed. Hereinafter, the embodiments will be described in more detail.

FIGS. 1A and 1B are diagrams illustrating exemplary gels according to an embodiment. In FIGS. 1A and 1B, two gels are illustrated.

The material of the gel 101 illustrated in FIG. 1A is, for example, silicone, and the gel 101 has a cone penetration of 69. In addition, the gel has a spherical shape and a radius of curvature of 2 mm on the side (specimen side) on which a holding member is arranged. The holding member is arranged, for example, to hold a sample between an objective and the sample when the gel is arranged in a microscope. On the other hand, the gel has a circular bottom surface and a conical shape (angle of 42° of a bottom surface of the gel) with an outer diameter of Φ 10 mm on the side (objective side) on which an assisting member is arranged.

The material of the gel 101 illustrated in FIG. 1B is, for example, silicone, and the gel 101 has a cone penetration of 69. In addition, the gel has a spherical shape and a radius of curvature of 1.69 mm on the holding member side (specimen side). On the other hand, the gel has a circular bottom surface and a conical shape (angle of 45° of the bottom surface) with an outer diameter of Φ 9 mm on the assisting member side (objective side).

In one embodiment, the center of the bottom surface of the gel 101 may have a shape along the shape of a tip surface of the objective. For example, when the tip surface of the objective has a planar shape, the center of the bottom surface of the gel 101 may have a planar shape, and when the tip surface of the objective has a spherical shape, the center of the bottom surface of the gel 101 may have a spherical shape. In addition, the outer edge region (region near the outer edge) of the gel 101 extending from the center of the bottom surface of the gel 101 toward the outer edge of the gel 101 may have a shape along the shape of the tip surface of the objective. When the center of the bottom surface of the gel 101 and the outer edge region of the gel 101 are continuous at the boundary between the center of the bottom surface of the gel 101 and the outer edge region of the gel 101, the outer edge region of the gel 101 can be said to be the bottom surface of the gel 101, which is the same as the center of the gel 101. For example, even if a slight step is present at the boundary between the center of the bottom surface of the gel 101 and the outer edge region of the gel 101, as long as the center of the bottom surface of the gel 101 and the outer edge region of the gel 101 can be regarded as the same surface, the outer edge region of the gel 101 can be said to be the bottom surface of the gel 101, which is the same as the center of the gel 101. However, when the position of the outer edge region of the gel 101 is far away from the position of the center of the bottom surface of the gel 101 such that the positions cannot be said to be substantially the same, the outer edge region of the gel 101 cannot be said to be the bottom surface of the gel 101. For example, it is also conceivable to have a shape in which the outer edge region of the gel 101 is extended along the side surface of the objective. In this case, the outer edge region of the gel 101 cannot be said to be the bottom surface of the gel 101. When the gel 101 having such an outer edge region is in direct close contact with the side surface of the objective (in a state where the assisting member is not present between the gel 101 and the objective on the side surface of the objective), the gel 101 is hardly detached from the objective, and there is a possibility that the gel 101 remains attached to an objective frame or the like. As an example, it is assumed that the shape of the gel 101 is formed so as to cover a frame member of the objective from the tip of the objective. In this case, the contact area between the gel 101 and the objective increases. Then, when the contact area increases, the adhesive force between the gel 101 and the objective increases with respect to the adhesive force between the gel 101 and the assisting member by that amount. As a result, it may be difficult to remove the gel 101 from the objective.

Then, for example, the outer edge region of the bottom surface of the gel 101 and the assisting member are fixed. In one example, the assisting member may be fixed to the gel 101 along the bottom surface of the gel 101. The bottom surface of the gel 101 may be, for example, a surface extending from the center of the bottom surface of the gel. In addition, the bottom surface of the gel 101 may be a surface on which the gel 101 faces the opening of the assisting member, or may include a surface on which the gel 101 faces the opening of the assisting member. In addition, the bottom surface of the gel 101 may be a surface in contact with the tip surface (lens surface) of the objective.

The shape of the gel 101 is not limited to the above, and other shapes may be used. Other examples of the gel 101 will be described later, for example, with reference to FIGS. 25A to 27B.

In addition, the gels 101 illustrated in FIGS. 1A and 1B are used for observation using, for example, a lens having an objective having a magnification of 40×, a numerical aperture NA of 0.8, a working distance WD of 3.18 mm, an effective diameter of Φ 5 mm of a lens tip, and a lens diameter of Φ 6.8 mm.

Next, an example of the assisting member used for arranging the gel on the objective will be described. An example of the assisting member will be described below using the mountain-shaped gel 101 illustrated in FIG. 1A as the gel. However, the embodiment is not limited thereto, and the gel may have other shapes.

Figure 2A:
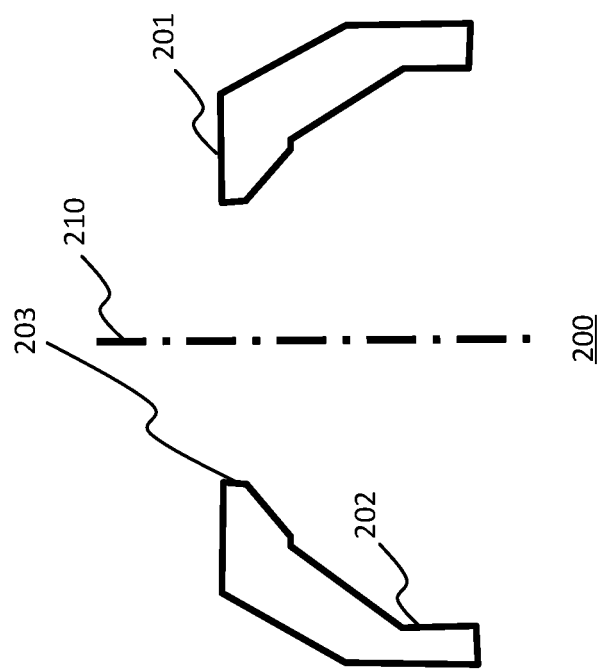

FIGS. 2A and 2B are diagrams illustrating an assisting member 200 for covering the objective according to the embodiment. FIG. 2A illustrates a cross section of the assisting member 200. FIG. 2B illustrates an upper surface of the assisting member 200. In FIG. 2A, an axis 210 indicates the position of the optical axis of the objective when the assisting member 200 is attached to the objective. The assisting member 200 is made of, for example, a metal such as aluminum or brass, a resin, or a rigid material such as ceramic. The assisting member 200 includes a first surface 201 on which the gel is disposed, a second surface 202 facing the frame member of the objective, and an opening portion 203.

In the embodiment illustrated in FIGS. 2A and 2B, the assisting member in the case of using the gel 101 having the shape illustrated in FIG. 1B is exemplified, and the diameter of the opening of the opening portion 203 of the assisting member 200 is smaller than the outer diameter (for example, the diameter of 9 mm of the bottom surface) of the gel, and is, for example, 7 mm or the like. In addition, the diameter of the opening of the opening portion 203 of the assisting member 200 is larger than the effective diameter of the objective. The first surface 201 of the assisting member 200 faces the gel 101, and a part of the first surface 201 has adhesion and is fixed to the gel 101 by an adhesive force. The first surface 201 includes the opening portion 203. The outer diameter of the first surface 201 is larger than the outer diameter (for example, the diameter of 9 mm of the bottom surface) of the gel, and is, for example, 12 mm.

FIGS. 3A and 3B are diagrams illustrating the attachment of the gel 101 to the assisting member 200 according to the embodiment. FIG. 3A illustrates a mold 301 for the gel 101. A member having good releasability may be used as the member of the mold 301 for the gel 101, and may be formed of, for example, an acrylonitrile butadiene styrene (ABS) resin, polyethylene, polypropylene, or a fluororesin. In another example, as the member of the mold 301 for the gel 101, for example, a silicone-based or fluorine-based release agent may be applied to the surface of the mold.

In addition, for example, the gel 101 is attached to the assisting member 200 in the following procedure.

Step 1: A pre-gelation liquid is injected into the gel mold.

Step 2: The assisting member 200 is placed as illustrated in FIG. 3A.

Step 3: The gel 101 is cured under gel curing conditions.

Step 4: The gel 101 is removed from the mold 301 for the gel 101 by being brought into close contact with the assisting member 200 (FIG. 3B).

The mold 301 for the gel 101 may include, for example, a mark indicating a position where the assisting member 200 is placed. Thus, in Step 2, for example, the gel 101 and the assisting member 200 can be aligned by placing the assisting member 200 on the mold 301 for the gel 101 in accordance with the mark.

In addition, in Step 4, for example, the gel 101 can be attached to the assisting member 200 and extracted from the mold 301 for the gel 101 by configuring the assisting member 200 so that the adhesive force of the assisting member 200 to the gel 101 is higher than that of the mold 301 to the gel 101. FIG. 3B illustrates a gel unit 300 in which the gel 101 is attached to the assisting member 200.

Figures 4A, 4B:
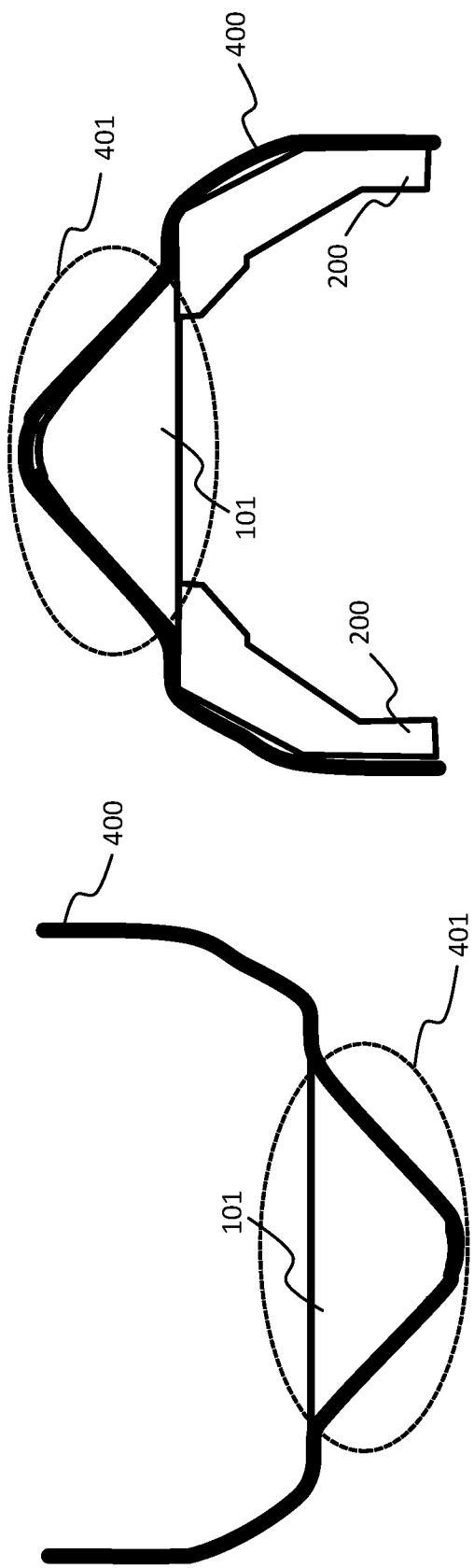
FIGS. 4A and 4B are diagrams illustrating attachment of the gel to the assisting member using a plastic cap.

A plastic cap (CAP) may be used to attach the gel 101 to the assisting member 200. FIGS. 4A and 4B are diagrams illustrating the attachment of the gel 101 to the assisting member 200 using the plastic cap. In the example illustrated in FIGS. 4A and 4B, the gel 101 is attached to the assisting member 200 in the following procedure, for example. For example, the plastic cap 400 is formed in accordance with the shape of the assisting member 200. Furthermore, a tip 401 of the plastic cap 400 in which the gel 101 is contained has the same shape as that of the mold for the gel 101.

Step 1: The pre-gelation liquid is gel-cured at the tip 401 of the plastic cap 400 (FIG. 4A).

Step 2: After the gelation, the gel 101 is attached to the assisting member 200 by covering the assisting member 200 with the plastic cap 400 having the gel therein (FIG. 4B).

Step 3: The plastic cap 400 is removed.

The gel 101 can be attached to the assisting member 200 and removed from the plastic cap 400 because the assisting member 200 has a higher adhesive force to the gel 101 than that of the tip 401 of the plastic cap 400 serving as a mold for the gel 101. The gel 101 may be attached from the plastic cap to the assisting member 200 in a state in which the assisting member 200 is attached to the objective.

The plastic cap may be made of, for example, polyethylene, polypropylene, or a fluororesin material having good releasability. Alternatively, a silicone-based or fluorine-based release agent may be applied to a mold surface of the plastic cap.

Figure 5B:
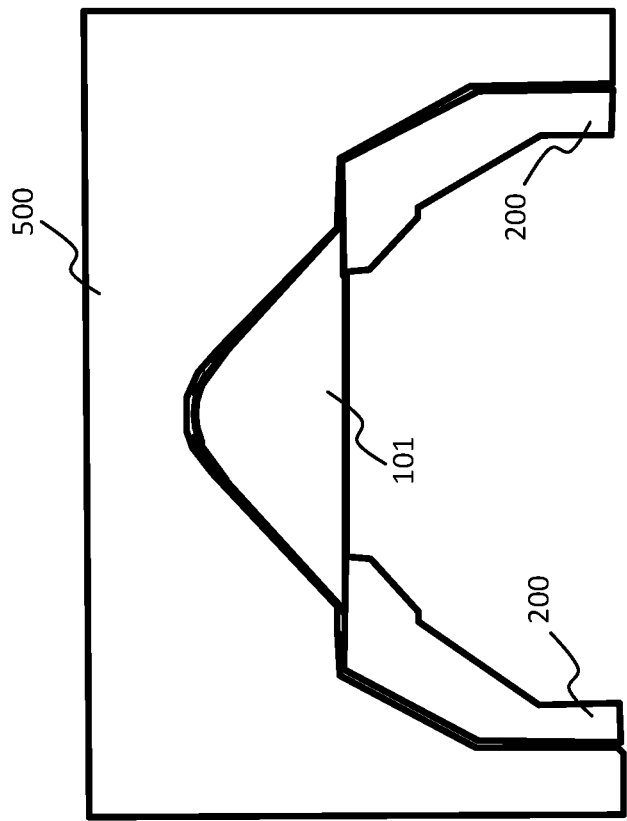
FIGS. 5A and 5B are diagrams illustrating attachment of the gel to the assisting member using a mold having a fitting portion.
Figure 5A:
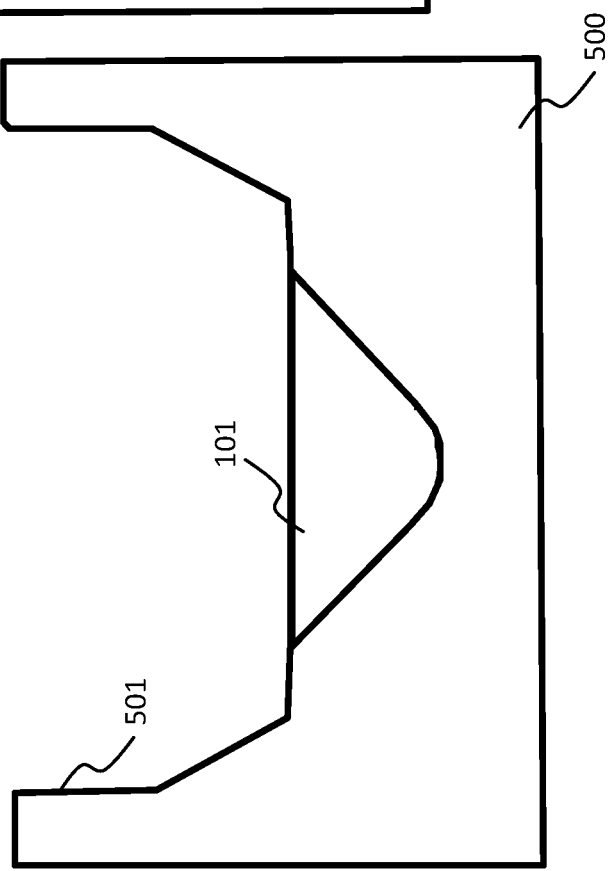

In addition, in order to attach the gel 101 to the assisting member 200, a mold 500 having a fitting portion 501 formed in a shape that fits with the outer shape of the assisting member 200 may be used. FIGS. 5A and 5B are diagrams illustrating the attachment of the gel 101 to the assisting member 200 using the mold 500 having the fitting portion 501. The mold 500 is formed in accordance with the outer shape of the assisting member 200.

In the example illustrated in FIGS. 5A and 5B, the gel 101 is attached to the assisting member 200 in the following procedure, for example.

Step 1: The pre-gelation liquid is gel-cured in the mold 500.

Step 2: After the gelation, the gel is attached to the assisting member by covering the assisting member 200 with the mold having the gel therein.

Step 3: The mold 500 is removed.

The gel 101 may be attached from the mold to the assisting member 200 in a state in which the assisting member 200 is attached to the objective. Since the assisting member 200 has a higher adhesive force to the gel than that of the mold 500 for the gel, the gel can be attached to the assisting member 200 and extracted from the mold 500.

Subsequently, the attachment of the gel 101 to the objective using the assisting member 200 will be exemplified. FIGS. 6A and 6B are diagrams illustrating the attachment of the assisting member 200 to a tip lens frame of an objective according to the embodiment. FIG. 6A illustrates a tip portion 600 of the objective. The tip portion 600 includes, for example, a tip lens 601 and a lens support frame 602.

In FIG. 6B, the assisting member 200 is disposed at the tip portion 600. For example, the shape of the assisting member 200 may be formed in accordance with the shape of the objective such that the assisting member 200 covers the objective to which the assisting member 200 is attached.

At least one of the assisting member 200 and the objective may include a fixing portion for fixing the assisting member 200 to the objective. The fixing portion may have, for example, a shape or a mechanism that fixes the assisting member 200 to the objective.

For example, in a region 610 illustrated in FIG. 6B, a set of a screw thread and a screw groove may be formed as the fixing portion on the assisting member 200 and the lens support frame 602. The fixing portion is, for example, a screw thread and a screw groove having a diameter of 14.4 mm and a screw pitch of 0.5 mm. The assisting member 200 is configured such that the gel 101 comes into close contact with the tip surface of the objective at a position where the screwing into the objective is stopped. In this case, by reversely rotating the screw, the assisting member 200 and the gel 101 can be separated from the objective.

Note that the fixing portion is not limited to screw connection of a screwing type, and may be another fixing type. For example, in another embodiment, a hook may be used to fix the assisting member 200 to the tip portion 600 of the objective, such as the tip lens 601 or the lens support frame 602. When a hook method or a hook-and-loop fastener method is used, an elastic body can be attached as the assisting member instead of a rigid body.

In one embodiment, the gel 101 may be disposed on the assisting member 200 such that the center of the opening of the opening portion 203 of the assisting member 200 coincides with the center axis of the gel 101 disposed on the assisting member 200 within a predetermined error range. In addition, when the gel 101 is attached to the objective by the assisting member 200, the assisting member 200, the objective, and the gel 101 may be positioned so that the optical axis of the objective and the central axis of the gel 101 coincide within a predetermined error range. FIG. 6B illustrates the optical axis 620 of the objective.

In addition, the assisting member 200 may be attached to the objective at various positions, and the shape of the assisting member 200 may be formed in accordance with the shape of the objective at the attachment position.

Figure 7B:
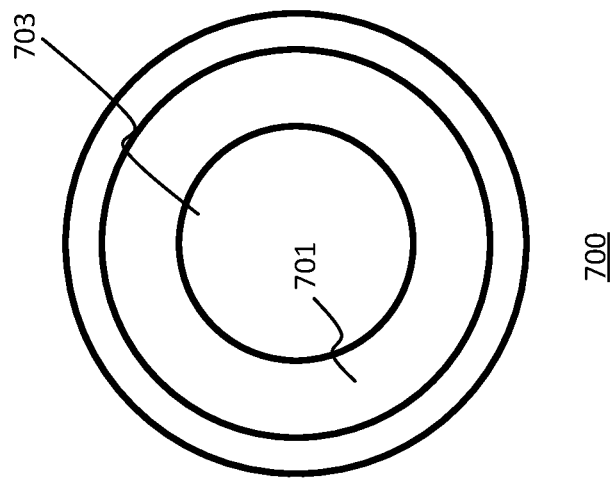
FIGS. 7A and 7B are diagrams illustrating another assisting member according to the embodiment.
Figure 7A:
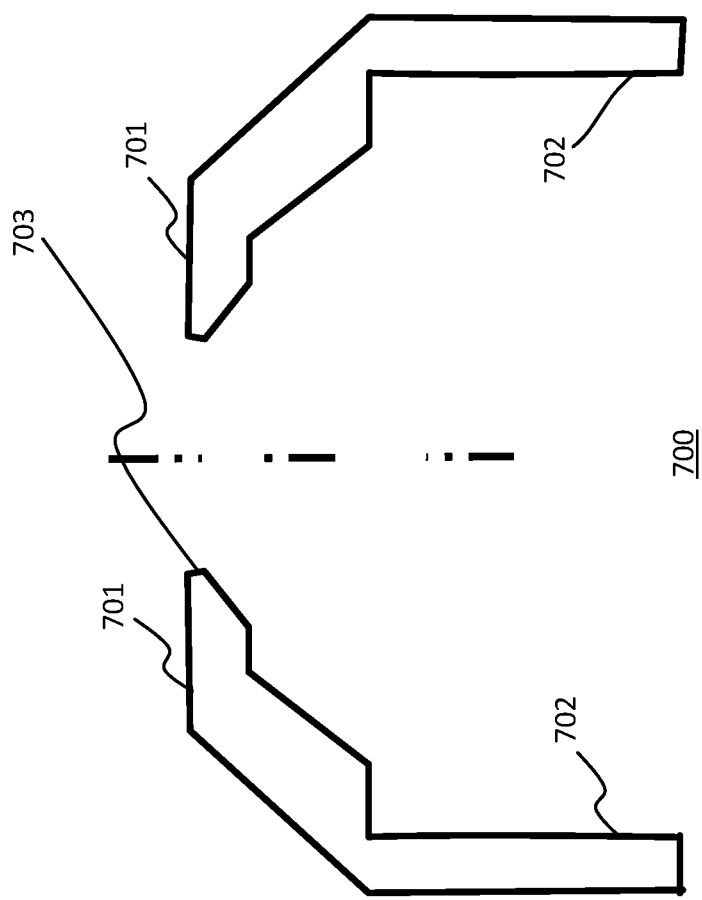

FIGS. 7A and 7B are diagrams illustrating another assisting member 700 according to the embodiment. FIG. 7A illustrates, for example, a cross-sectional view of the assisting member 700. FIG. 7B illustrates an upper surface of the assisting member 700. The assisting member 700 is made of, for example, a rigid material such as metal, resin, or ceramic. The assisting member 700 includes a first surface 701 on which the gel 101 is disposed, a second surface 702 facing a frame member of an objective, and an opening portion 703.

In the embodiment illustrated in FIGS. 7A and 7B, the assisting member in the case of using the gel 101 having the shape illustrated in FIG. 1B is exemplified, and the diameter of the opening of the opening portion 703 of the assisting member 700 is smaller than the outer diameter (for example, the diameter of 9 mm of the bottom surface) of the gel, and is, for example, 7 mm or the like. In addition, the diameter of the opening of the opening portion 703 of the assisting member 700 is larger than the effective diameter of the objective. The first surface 701 of the assisting member 700 faces the gel 101, and a part of the first surface 701 is fixed to the gel 101 by an adhesive force. The first surface 701 includes the opening portion 703. The outer diameter of the first surface 701 is larger than the outer diameter (for example, the diameter of 9 mm of the bottom surface) of the gel, and is, for example, 14 mm.

Subsequently, the attachment of the gel 101 to the objective using the assisting member 700 will be exemplified. FIGS. 8A and 8B are diagrams illustrating the attachment of the assisting member 700 to a tip lens frame of the objective according to the embodiment. FIG. 8A illustrates a tip portion 800 of the objective. The tip portion 800 includes a tip lens 801, a lens support frame 802, a barrel 803 that houses the lens support frame 802, and a lens 804.

In FIG. 8B, the assisting member 700 is disposed at the tip portion 800. For example, the shape of the assisting member 700 may be formed in accordance with the shape of the objective such that the assisting member 700 covers the objective to which the assisting member 700 is attached.

At least one of the assisting member 700 and the objective may include a fixing portion for fixing the assisting member 700 to the objective. The fixing portion may have, for example, a shape or a mechanism that fixes the assisting member 700 to the objective.

For example, in a region 810 illustrated in FIG. 8B, a screw thread may be formed on one of the assisting member 700 and the tip portion 800, and a screw groove may be formed on the other of the assisting member 700 and the tip portion 800 as the fixing portion. The fixing portion has, for example, a diameter of 19 mm and a screw pitch of 0.5 mm. The assisting member 700 is configured such that the gel 101 comes into close contact with the tip surface of the objective at a position where the screwing into the objective is stopped. In this case, by reversely rotating the screw, the assisting member 700 and the gel 101 can be separated from the objective.

Note that the fixing portion is not limited to screw connection of a screwing type, and may be another fixing type. For example, in another embodiment, a hook may be used to fix the assisting member 700 to the tip portion 800. When a hook method or a hook-and-loop fastener method is used, an elastic body can be attached as the assisting member instead of a rigid body.

In addition, the inner diameter of the fixing portion of the assisting member 700 for attachment to the barrel 803 of the objective in the region 810 is, for example, 19 mm and the screw pitch is 0.5 mm. Since the barrel 803 of the objective has an outer diameter larger than that of the lens support frame 602 of the tip portion 600 of the objective illustrated in FIGS. 6A and 6B, the inner diameter of the fixing portion of the assisting member 700 in the region 810 is larger than the inner diameter of the fixing portion of the assisting member 200 in the region 610 in FIG. 6B.

In one embodiment, the gel 101 may be disposed on the assisting member 700 such that the center of the opening of the opening portion 703 of the assisting member 700 coincides with the center axis of the gel 101 disposed on the assisting member 700 within a predetermined error range. In addition, when the gel 101 is attached to the objective by the assisting member 700, the assisting member 700, the objective, and the gel 101 may be positioned so that the optical axis of the objective and the central axis of the gel 101 coincide within a predetermined error range. FIG. 8B illustrates the optical axis 820 of the objective.

Figure 9B:
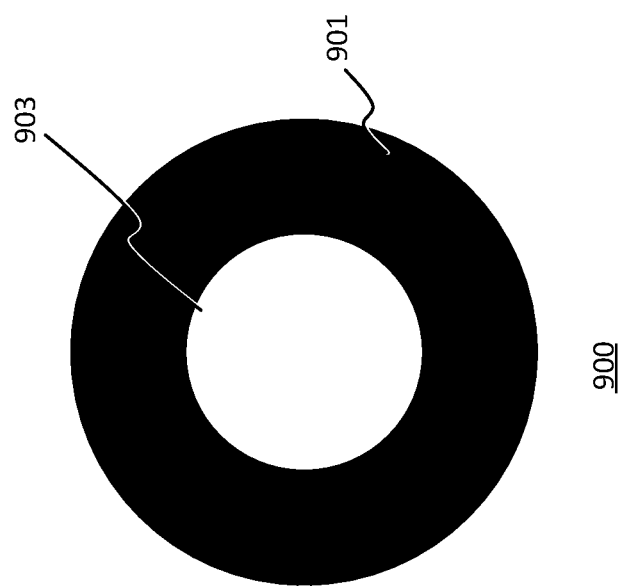
FIGS. 9A and 9B are diagrams illustrating a sheet-like assisting member according to the embodiment.
Figure 9A:
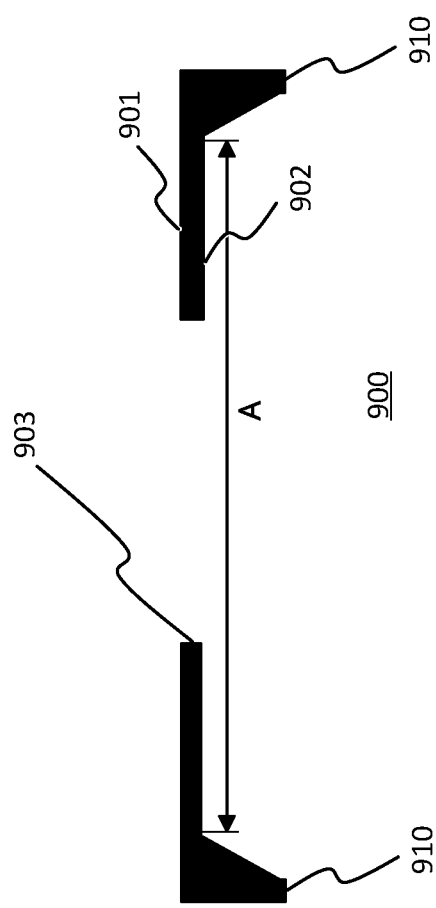

Subsequently, a sheet-like assisting member 900 will be exemplified. FIGS. 9A and 9B are diagrams illustrating the sheet-like assisting member 900 according to the embodiment. FIG. 9A illustrates a cross section of the assisting member 900. FIG. 9B illustrates an upper surface of the assisting member 900. The assisting member 900 is an annular sheet member including an annular sheet. The assisting member 900 is made of, for example, a rigid material such as metal, resin, or ceramic. The assisting member 900 includes a first surface 901 on which the gel 101 is disposed, a second surface 902 facing a frame member of an objective, and an opening portion 903.

In the embodiment illustrated in FIGS. 9A and 9B, the assisting member in the case of using the gel 101 having the shape illustrated in FIG. 1B is exemplified, and the diameter of the opening of the opening portion 903 of the assisting member 900 is smaller than the outer diameter (for example, the diameter of 9 mm of the bottom surface) of the gel, and is, for example, 7 mm or the like. In addition, the diameter of the opening of the opening portion 903 of the assisting member 900 is larger than the effective diameter of the objective. The first surface 901 of the assisting member 900 faces the gel 101, and a part of the first surface 901 is fixed to the gel 101 by an adhesive force. The first surface 901 includes the opening portion 903. The outer diameter of the first surface 901 is larger than the outer diameter (for example, the diameter of 9 mm of the bottom surface) of the gel, and is, for example, 14 mm. The second surface 902 disposed on the objective side of the assisting member 900 has an adhesive force to the surface of the objective on the tip side of the objective, and the assisting member 900 can be attached to the objective by the adhesive force and can be detached from the objective.

Figure 10B:
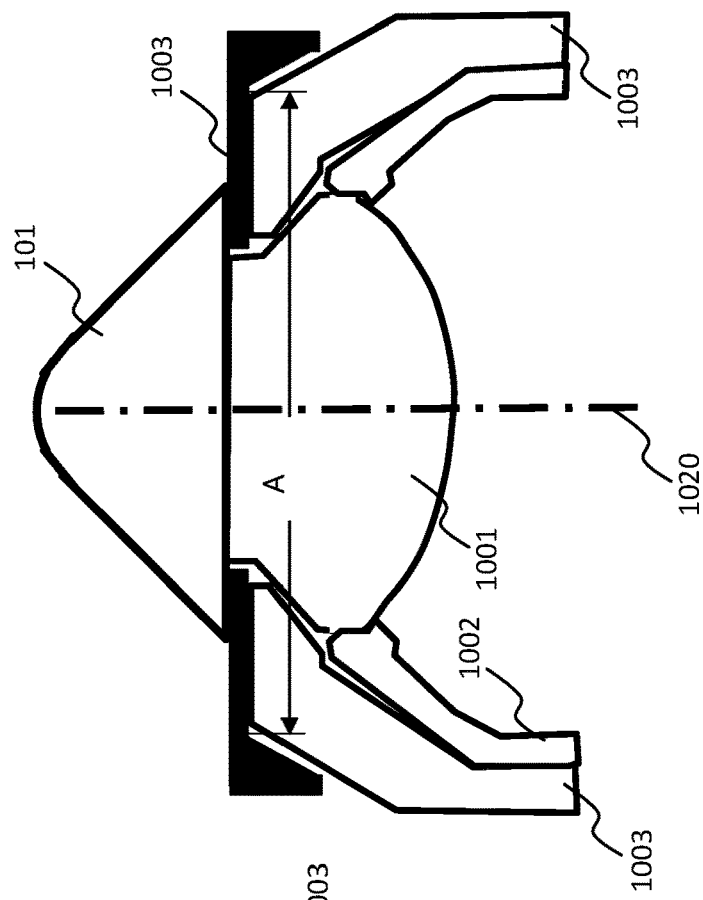
FIGS. 10A and 10B are diagrams illustrating attachment of the assisting member to an objective according to the embodiment.

In the example illustrated in FIG. 9B, the assisting member 900 has a protrusion 910 having a protruding shape. The shape of the inside of the protrusion 910 may be formed in accordance with the shape of the tip of the objective. For example, in FIG. 9A, as illustrated in FIG. 10B described later, the protrusion 910 is formed at an angle of 60 degrees in accordance with the shape of the tip of the objective. In addition, the outer diameter of a portion A of the assisting member 900 is formed in accordance with the diameter of the tip of the objective, and is, for example, 12.1 mm.

Figure 10A:
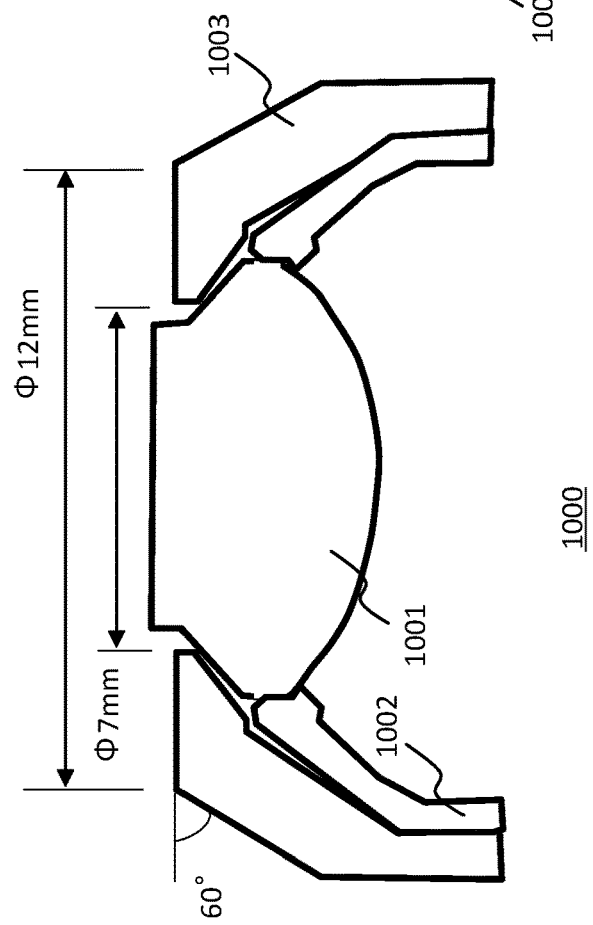

FIGS. 10A and 10B are diagrams illustrating the attachment of the assisting member 900 to the objective. FIG. 10A illustrates a tip portion 1000 of the objective. The tip portion 1000 includes a tip lens 1001, a lens support frame 1002, and a tip outer frame 1003. The outer diameter of the upper surface of the tip outer frame 1003 is 12 mm. The inclination angle of the outer surface of the tip outer frame 1003 is 60 degrees.

FIG. 10B is a diagram illustrating the attachment of the assisting member 900 to the tip portion 1000 of the objective. The protrusion 910 of the assisting member 900 is configured to fit with the tip outer frame 1003 of the objective, so that the gel 101 can be positioned in close contact with the tip lens 1001 of the objective.

In one embodiment, the gel 101 may be disposed on the assisting member 900 such that the center of the opening of the opening portion 903 of the assisting member 900 coincides with the center axis of the gel 101 disposed on the assisting member 900 within a predetermined error range. In addition, when the gel 101 is attached to the objective by the assisting member 900, the protrusion 910 of the assisting member 900, the objective, and the gel 101 may be positioned so that the optical axis of the objective and the central axis of the gel 101 coincide within a predetermined error range. FIG. 10B illustrates the optical axis 1020 of the objective.

Figure 11B:
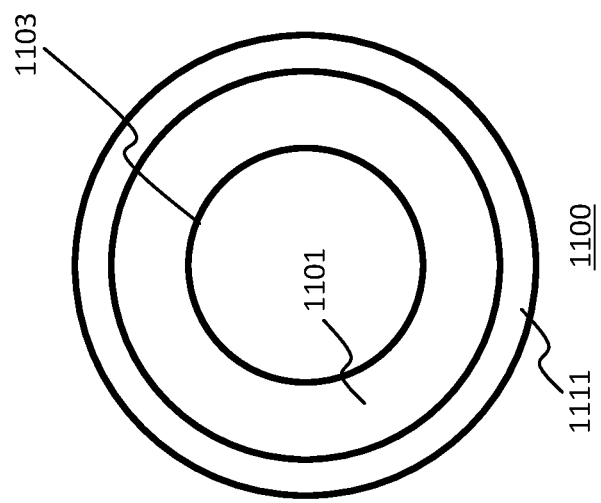
FIGS. 11A and 11B are diagrams illustrating an example of an assisting member made of an elastic material according to the embodiment.
Figure 11A:
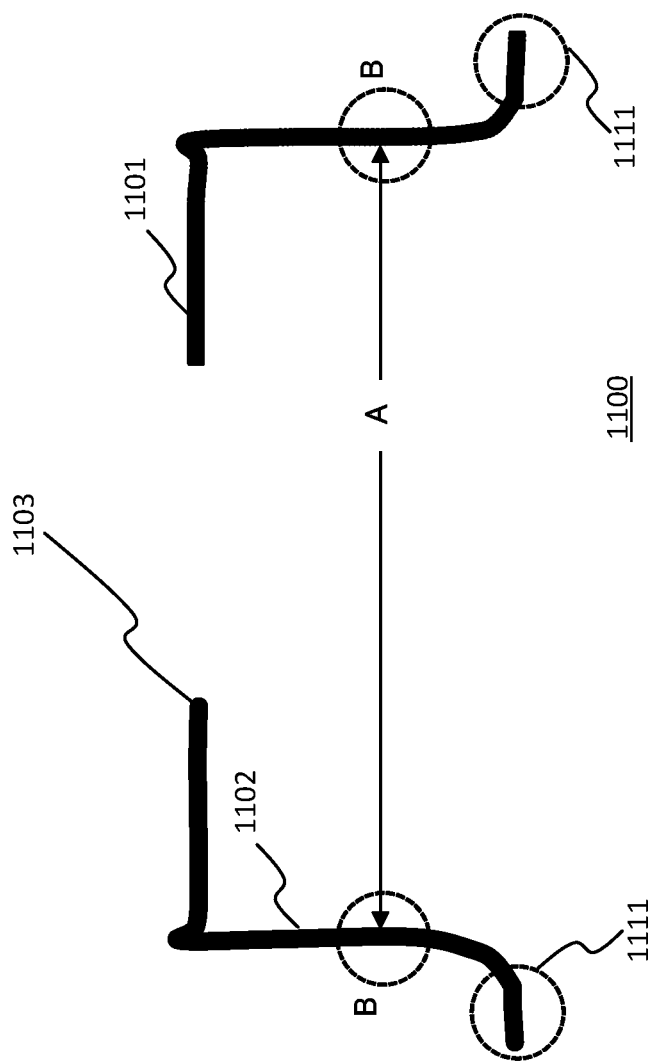

Next, an example in which an elastic body is used as the assisting member will be described. FIGS. 11A and 11B are diagrams illustrating an example of an assisting member 1100 made of an elastic material. FIG. 11A illustrates a cross section of the assisting member 1100. FIG. 11B illustrates an upper surface of the assisting member 1100. The assisting member 1100 is made of, for example, an elastic material such as urethane rubber. The assisting member 1100 includes a first surface 1101 on which the gel 101 is disposed, a second surface 1102 facing a frame member of an objective, and an opening portion 1103. In the example illustrated in FIGS. 11A and 11B, the assisting member 1100 has, for example, a cap structure having the opening portion 1103 made of thin rubber.

In the embodiment illustrated in FIGS. 11A and 11B, the assisting member in the case of using the gel 101 having the shape illustrated in FIG. 1A is exemplified, and the diameter of the opening of the opening portion 1103 of the assisting member 1100 is smaller than the outer diameter (for example, the diameter of 10 mm of the bottom surface) of the gel, and is, for example, 7 mm or the like. In addition, the diameter of the opening of the opening portion 1103 of the assisting member 1100 is larger than the effective diameter of the objective. The first surface 1101 includes the opening portion 1103. The outer diameter of the first surface 1101 is larger than the outer diameter (for example, the diameter of 10 mm of the bottom surface) of the gel, and is, for example, 16 mm.

In addition, the assisting member 1100 includes, for example, a fixing portion (portion indicated by B in FIG. 11A) having a structure to which an elastic force for fixing the assisting member 1100 to the objective is applied. For example, the inner diameter A of the fixing portion may be smaller than the outer diameter of the side surface of the objective so that the elastic force for fixing the assisting member 1100 is applied. For example, when the outer diameter of the side surface of the objective is 16 mm, the inner diameter A of the fixing portion may be 15.8 mm.

The assisting member 1100 includes a flange 1111 for easy gripping. Therefore, the user can increase the inner diameter of the assisting member 1100 by the elasticity of the rubber by pulling the portion of the flange 1111, and the fixing portion having the inner diameter smaller than the outer diameter of the side surface of the objective can be temporarily expanded and drawn into the side surface of the objective. When the flange 1111 is released, the assisting member 1100 can be attached and fixed to the objective by a force that returns the assisting member 1100 from elastic deformation caused by the elastic force.

Figure 12B:
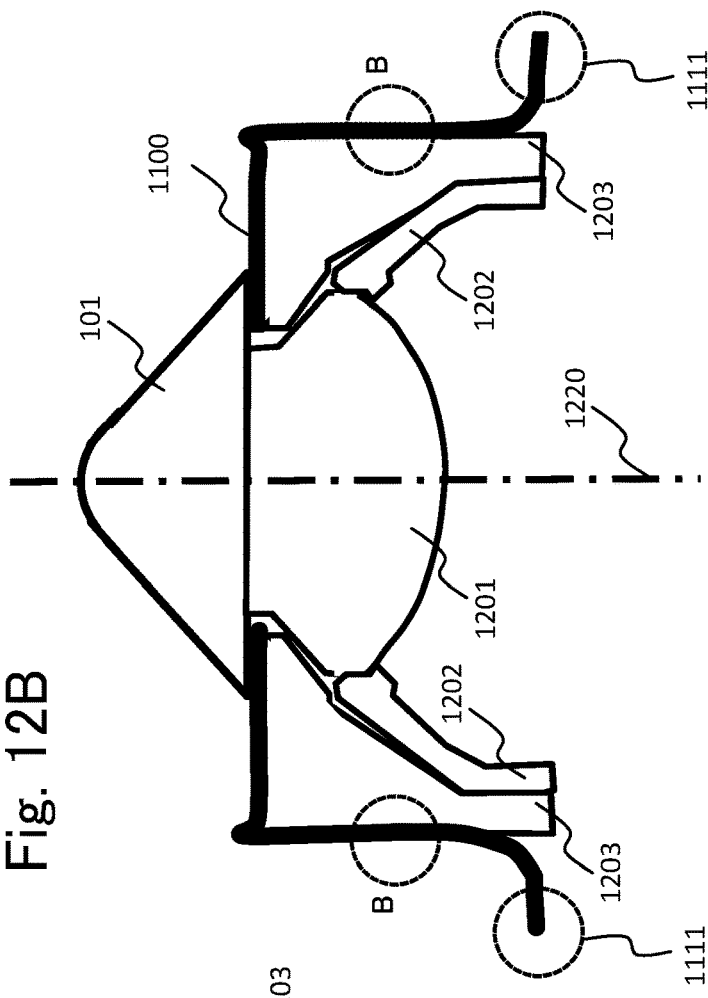
FIGS. 12A to 12C are diagrams illustrating attachment of the assisting member to an objective according to the embodiment.
Figure 12C:
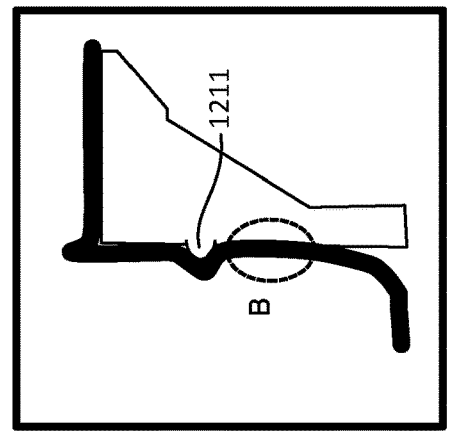
Figure 12A:
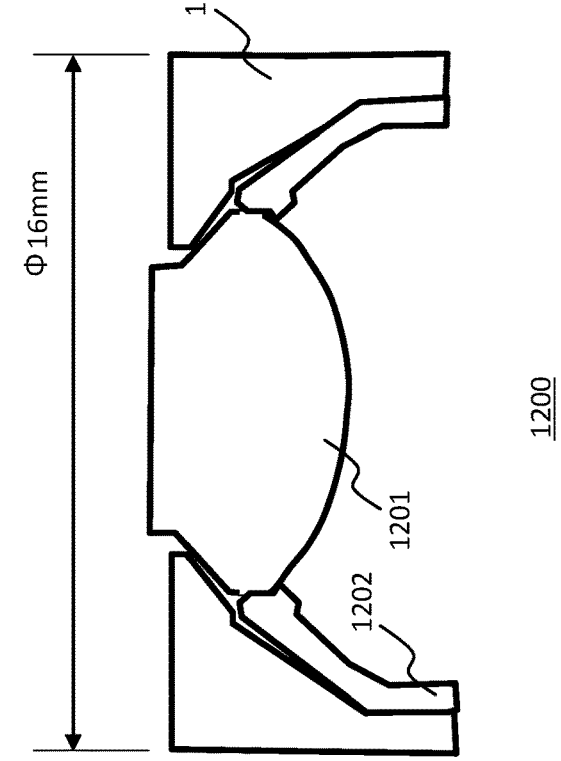

FIGS. 12A to 12C are diagrams illustrating the attachment of the assisting member 1100 to the objective according to the embodiment. FIG. 12A illustrates a tip portion 1200 of the objective. The tip portion 1200 includes a tip lens 1201, a lens support frame 1202, and a tip outer frame 1203. The outer diameter of the tip outer frame 1203 is, for example, 16 mm.

FIG. 12B is a diagram illustrating the attachment of the assisting member 1100 to the tip portion 1200 of the objective. The tip outer frame 1203 of the objective is drawn into the inside of the assisting member 1100 so as to be inserted in the assisting member 1100 by pulling and expanding the flange 1111, and thereafter, the fixing portion (portion indicated by B in FIGS. 12B and 12C) of the assisting member 1100 is fixed to the tip portion 1200 of the objective by an elastic force by releasing the flange 1111. For example, since the inner diameter of the region of the fixing portion (portion indicated by B in FIGS. 12B and 12C) is smaller than the outer diameter of the tip outer frame 1203, the assisting member 1100 is fixed to the tip portion 1200 of the objective by the elastic force.

As illustrated in FIGS. 12A to 12C, the tip lens 1201 is disposed so as to be in close contact with the gel 101 when the tip outer frame 1203 is drawn into the inside of the assisting member 1100 so as to be inserted in the assisting member 1100. In addition, since the inner diameter of the fixing portion is slightly smaller than the outer diameter of the tip outer frame 1203, the assisting member 1100 can be fixed and attached to the tip portion 1200 by the elastic force.

Note that the length (the length of the portion indicated by B in FIGS. 12B and 12C along the side surface of the objective) of the fixing portion to which the elastic force is applied is preferably 5 mm or more. For example, in a case where the length of the fixing portion is 5 mm or less, the elastic force is less likely to be applied, and the assisting member 1100 may be easily displaced. In addition, for example, by providing, as the fixing portion, a protrusion 1211 (for example, a protrusion of 0.2 mm) illustrated in FIG. 12C on the side surface of the objective on the gel side of the portion indicated by B, the assisting member 1100 can be made less likely to be displaced even when the length of the portion indicated by B is 5 mm or less.

In one embodiment, the gel 101 may be disposed on the assisting member 1100 such that the center of the opening of the opening portion 1103 of the assisting member 1100 coincides with the center axis of the gel 101 disposed on the assisting member 1100 within a predetermined error range. In addition, when the gel 101 is attached to the objective by the assisting member 1100, the assisting member 1100, the objective, and the gel 101 may be positioned so that the optical axis of the objective and the central axis of the gel 101 coincide within a predetermined error range. FIG. 12B illustrates the optical axis 1220 of the objective.

Figure 13:
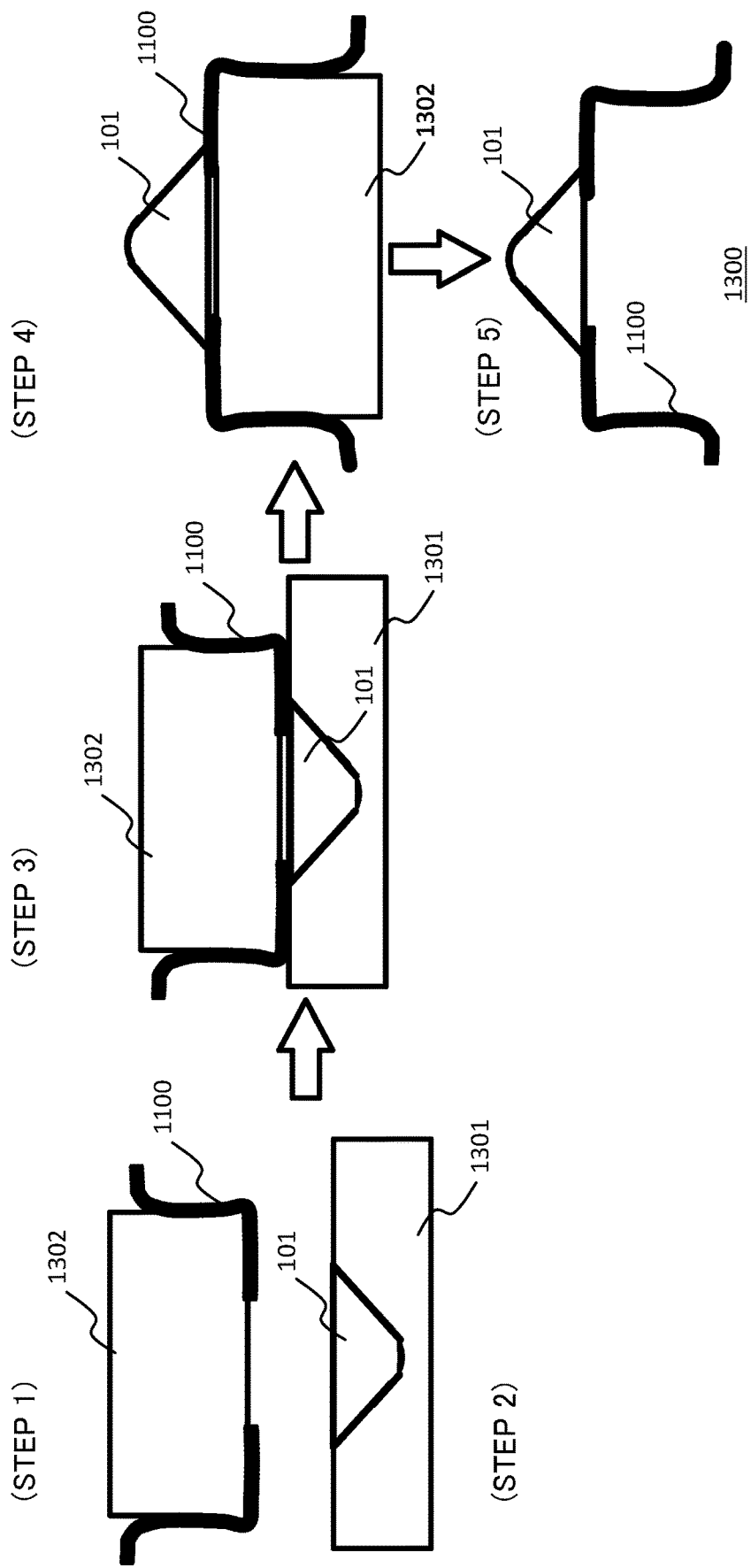
FIG. 13 is a diagram illustrating an example of a method of attaching a gel to the assisting member according to the embodiment.

Next, a method of attaching the gel 101 to the assisting member 1100 will be described. FIG. 13 is a diagram illustrating an example of a method of attaching the gel 101 to the assisting member 1100. A mold 1301 for the gel 101 is used for the attachment of the gel 101 to the assisting member 1100, for example. A member having good releasability may be used as the member of the mold 1301 for the gel 101, and may be formed of, for example, an acrylonitrile butadiene styrene (ABS) resin, polyethylene, polypropylene, or a fluororesin. In another example, as the member of the mold 1301 for the gel 101, for example, a silicone-based or fluorine-based release agent may be applied to the surface of the mold.

In the example illustrated FIG. 13, the gel 101 is attached to the assisting member 1100 in the following procedure, for example.

Step 1: A jig 1302 is inserted into the assisting member 1100. The jig 1302 may have the same outer diameter as that of the tip portion 1200 of the objective.

Step 2: The pre-gelation liquid is injected into the mold 1301 for the gel 101.

Step 3: The assisting member 1100 and the jig 1302 are placed on the mold 1301 for the gel 101. A position where the assisting member 1100 is placed may be, for example, marked on the mold 1301 for the gel 101. Thereafter, the pre-gelation liquid is cured under gel curing conditions to form the gel 101.

Step 4: The gel 101 is taken out from the mold 1301 by pulling up the assisting member 1100 and the jig 1302.

Step 5: The flange 1111 of the assisting member 1100 is pulled to spread, and the assisting member 1100 and the gel 101 are removed from the jig 1302.

In Step 2, for example, the gel 101 and the assisting member 1100 can be aligned by placing the assisting member 1100 on the mold 1301 for the gel 101 in accordance with a mark indicating the position where the assisting member 1100 is placed on the mold 1301 for the gel 101.

In addition, in Step 4, for example, since the assisting member 1100 is configured to have a higher adhesive force to the gel 101 than that of the mold 1301 for the gel 101, it is possible to bring the gel 101 into close contact with the assisting member 1100 and extract the gel 101 from the mold 1301. In Step 5 illustrated in FIG. 13, a gel unit 1300 in which the gel 101 is attached to the assisting member 1100 is illustrated.

Figure 14:
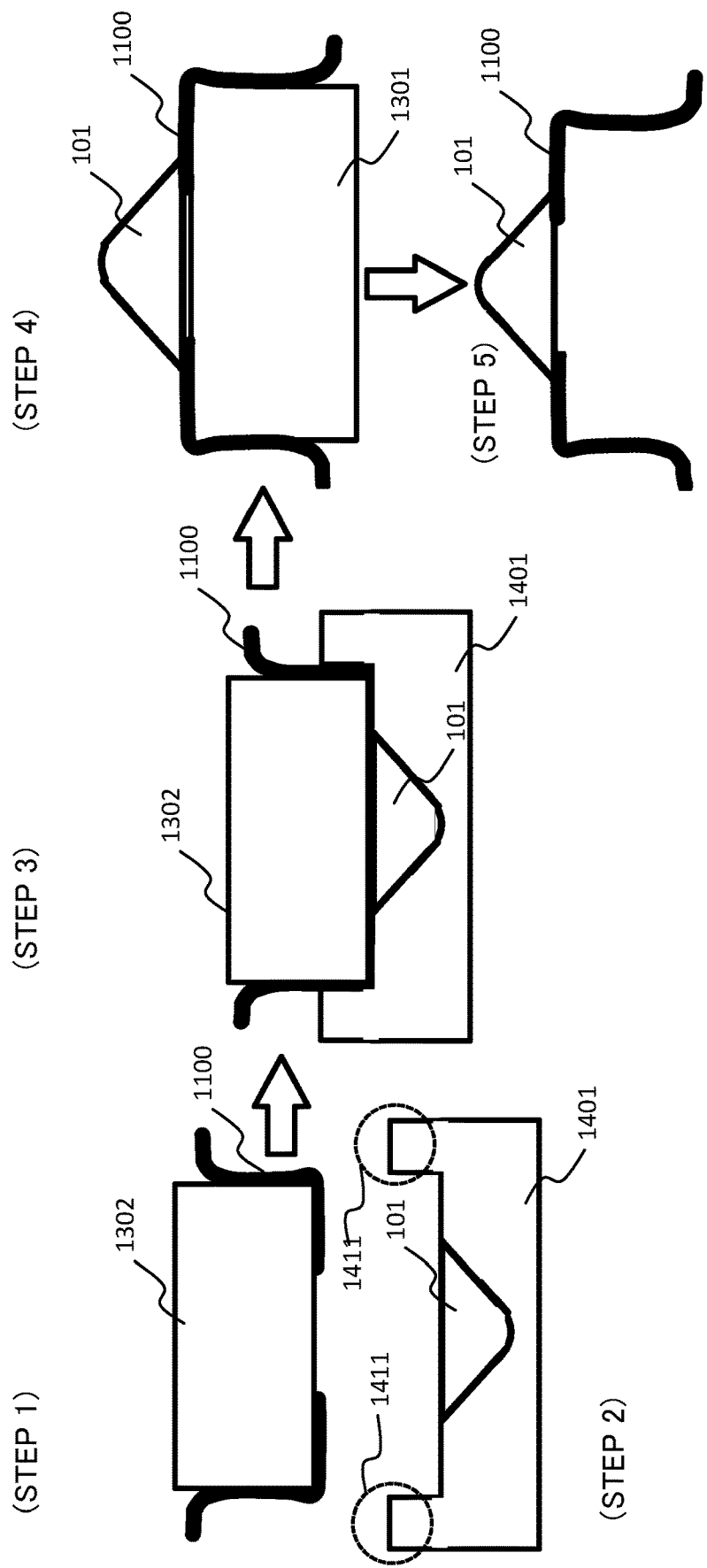
FIG. 14 is a diagram illustrating another example of the method of attaching the gel to the assisting member according to the embodiment.

FIG. 14 is a diagram illustrating another example of the method of attaching the gel 101 to the assisting member 1100. FIG. 14 illustrates steps corresponding to those illustrated in FIG. 13. However, in the example illustrated in FIG. 14, a mold 1401 for the gel 101 has a convex portion 1411 formed in accordance with the shapes of the assisting member 1100 and the jig 1302, and the assisting member 1100 and the jig 1302 are fitted to the convex portion 1411 of the mold 1401, so that the assisting member 1100 can be positioned and attached to the gel 101.

Figure 15B:
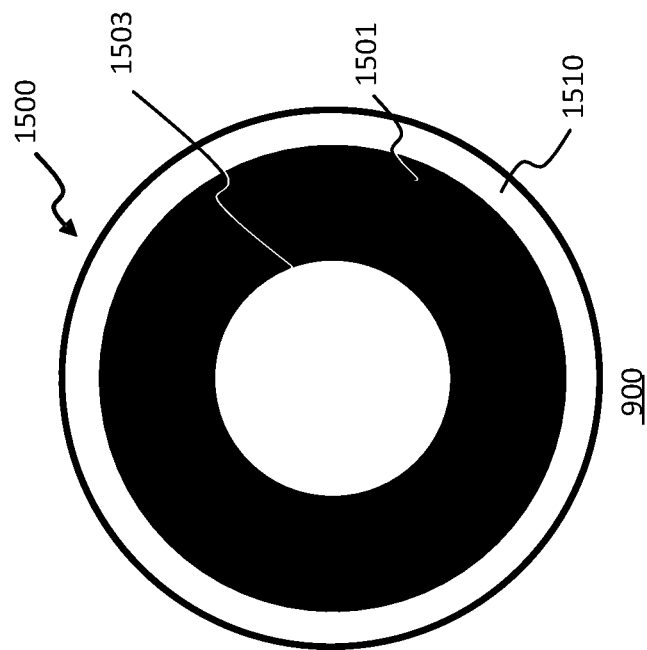
FIGS. 15A and 15B are diagrams illustrating a sheet-like assisting member according to the embodiment.
Figure 15A:
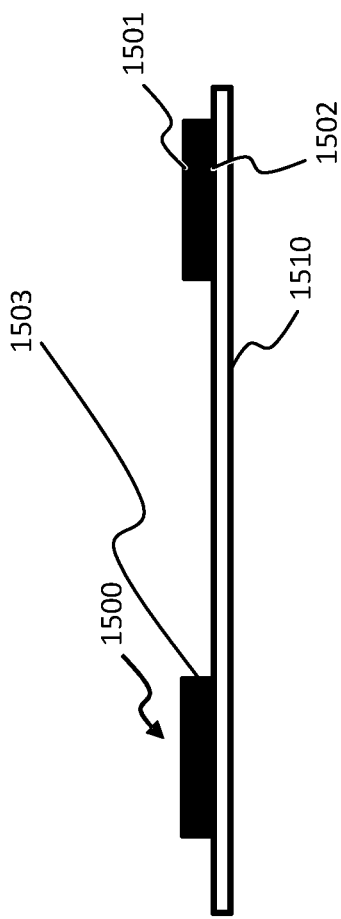

Subsequently, a sheet-like assisting member 1500 will be exemplified. FIGS. 15A and 15B are diagrams illustrating the sheet-like assisting member 1500 according to an embodiment. FIG. 15A illustrates a cross section of the assisting member 1500. FIG. 15B illustrates an upper surface of the assisting member 1500.

The sheet-like assisting member 1500 includes, for example, a sheet-like annular sheet member having an annular shape. The assisting member 1500 is made of, for example, a material such as metal, resin, rubber, or an adhesive sheet. The assisting member 1500 includes a first surface 1501 on which the gel is disposed, a second surface 1502 facing a frame member of an objective, and an opening portion 1503. The second surface 1502 has an adhesive force, and a protective member 1510 (for example, a cover)

that covers the second surface 1502 is attached to protect the second surface 1502 having an adhesive force.

In the embodiment illustrated in FIGS. 15A and 15B, the assisting member in the case of using the gel 101 having the shape illustrated in FIG. 1A is exemplified, and the diameter of the opening of the opening portion 1503 of the assisting member 1500 is smaller than the outer diameter (for example, the diameter of 10 mm of the bottom surface) of the gel, and is, for example, 7 mm or the like. In addition, the diameter of the opening of the opening portion 1503 of the assisting member 1500 is larger than the effective diameter of the objective. The first surface 1501 of the assisting member 1500 faces the gel 101, and a part of the first surface 1501 is fixed to the gel 101 by an adhesive force. The first surface 1501 includes the opening portion 1503. The outer diameter of the first surface 1501 is larger than the outer diameter (for example, the diameter of 10 mm of the bottom surface) of the gel, and is, for example, 12 mm. The assisting member 1500 has, for example, a structure in close contact with the tip portion of the objective, and can be attached to and detached from the tip portion of the objective.

Figure 16B:
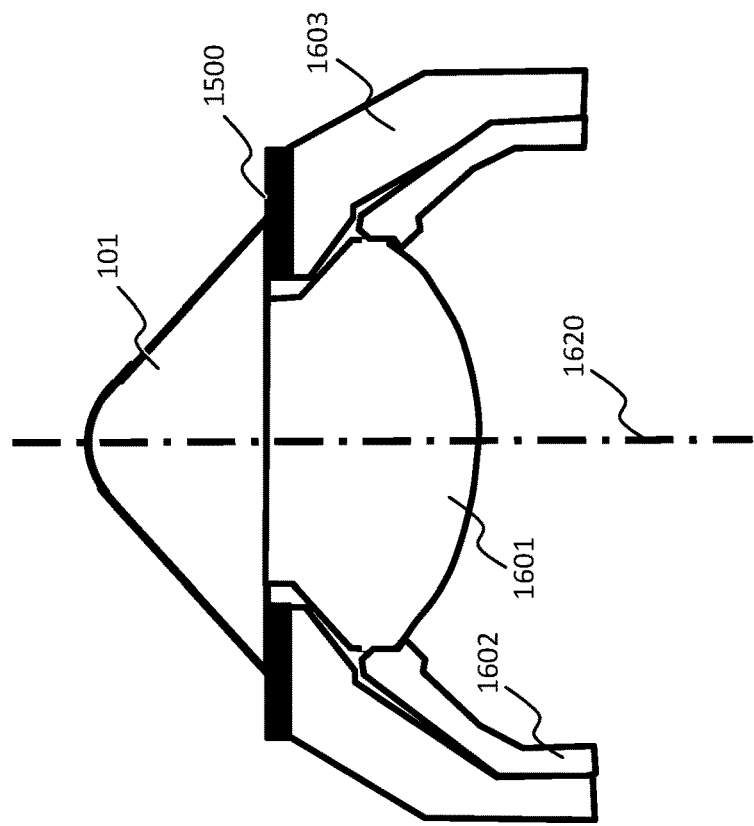
FIGS. 16A and 16B are diagrams illustrating attachment of the assisting member to an objective according to the embodiment.
Figure 16A:
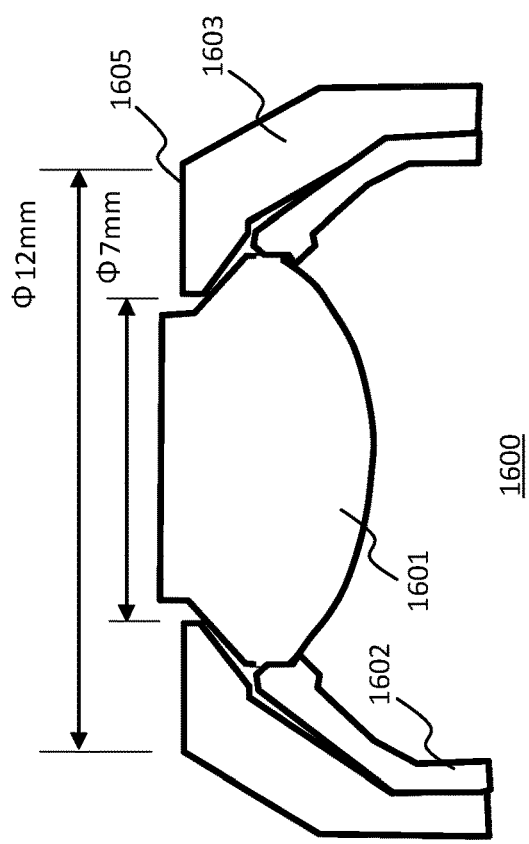

FIGS. 16A and 16B are diagrams illustrating the attachment of the assisting member 1500 to the objective according to the embodiment. FIG. 16A illustrates a tip portion 1600 of the objective. The tip portion 1600 includes a tip lens 1601, a lens support frame 1602, and a tip outer frame 1603. An outer diameter of a surface 1605 of the tip frame of the tip outer frame 1603 is, for example, 12 mm.

FIG. 16B is a diagram illustrating the attachment of the assisting member 1500 to the tip portion 1600 of the objective. In the assisting member 1500, for example, the second surface 1502 to be disposed on the objective side has an adhesive force to the surface 1605 of the tip frame of the objective. The assisting member 1500 can be attached to the objective by, for example, an adhesive force, and detached from the objective. In addition, for example, by making the diameter of the opening of the opening portion 1503 of the assisting member 1500 equal to the diameter of the tip surface of the objective, the assisting member 1500 can be easily attached to a position relatively determined with respect to the optical axis of the objective. As a result, when the gel 101 is attached to the objective by the assisting member 1500, the assisting member 1500, the objective, and the gel 101 may be positioned so that the optical axis of the objective and the central axis of the gel 101 coincide within a predetermined error range. FIG. 16B illustrates the optical axis 1620 of the objective.

Figure 17:
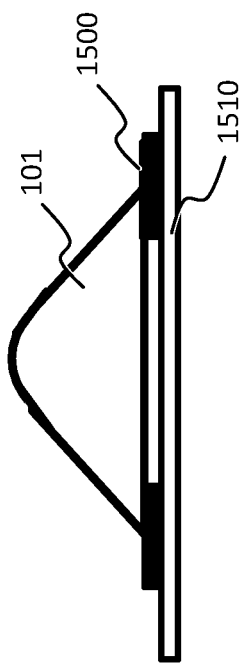
FIG. 17 is a diagram illustrating a method of attaching the gel to the assisting member according to the embodiment.
Figure 17:
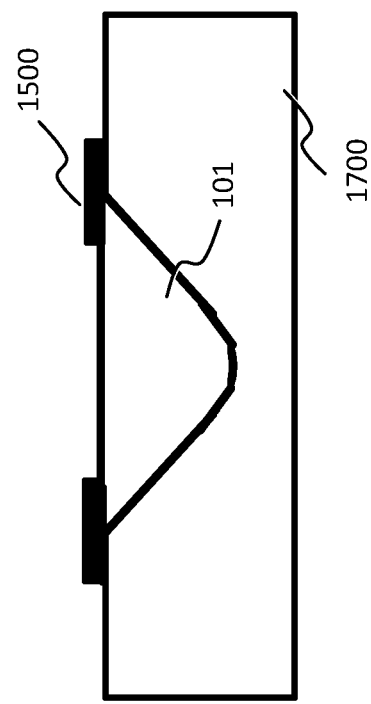

FIG. 17 is a diagram illustrating an example of a method of attaching the gel 101 to the assisting member 1500. A member having good releasability may be used as the member of a mold 1700 for the gel 101, and may be formed of, for example, an acrylonitrile butadiene styrene (ABS) resin, polyethylene, polypropylene, or a fluororesin. In another example, as the member of the mold 1700 for the gel 101, for example, a silicone-based or fluorine-based release agent may be applied to the surface of the mold.

In the example illustrated FIG. 17, the gel 101 is attached to the assisting member 1500 in the following procedure, for example.
  Step 1: The pre-gelation liquid is injected into the gel mold 1700, the assisting member 1500 is placed on the gel mold 1700, and the pre-gelation liquid is cured under gel curing conditions to form the gel 101. A position where the assisting member 1500 is placed may be, for example, marked on the mold 1700 for the gel 101.
  Step 2: The gel 101 is pulled up with the assisting member 1500, the gel 101 is taken out from the mold 1700 for the gel, and the protective member 1510 is pasted and stored on the surface of the assisting member 1500 having an adhesive force. By pasting the protective member 1510 on the assisting member 1500, the adhesive force of the assisting member 1500 can be protected.

In order to apply an adhesive force to the assisting member 1500, a double-sided tape or the like may be attached to the second surface 1502 of the assisting member 1500, or the second surface 1502 may be formed of an adhesive rubber.

Figure 18:
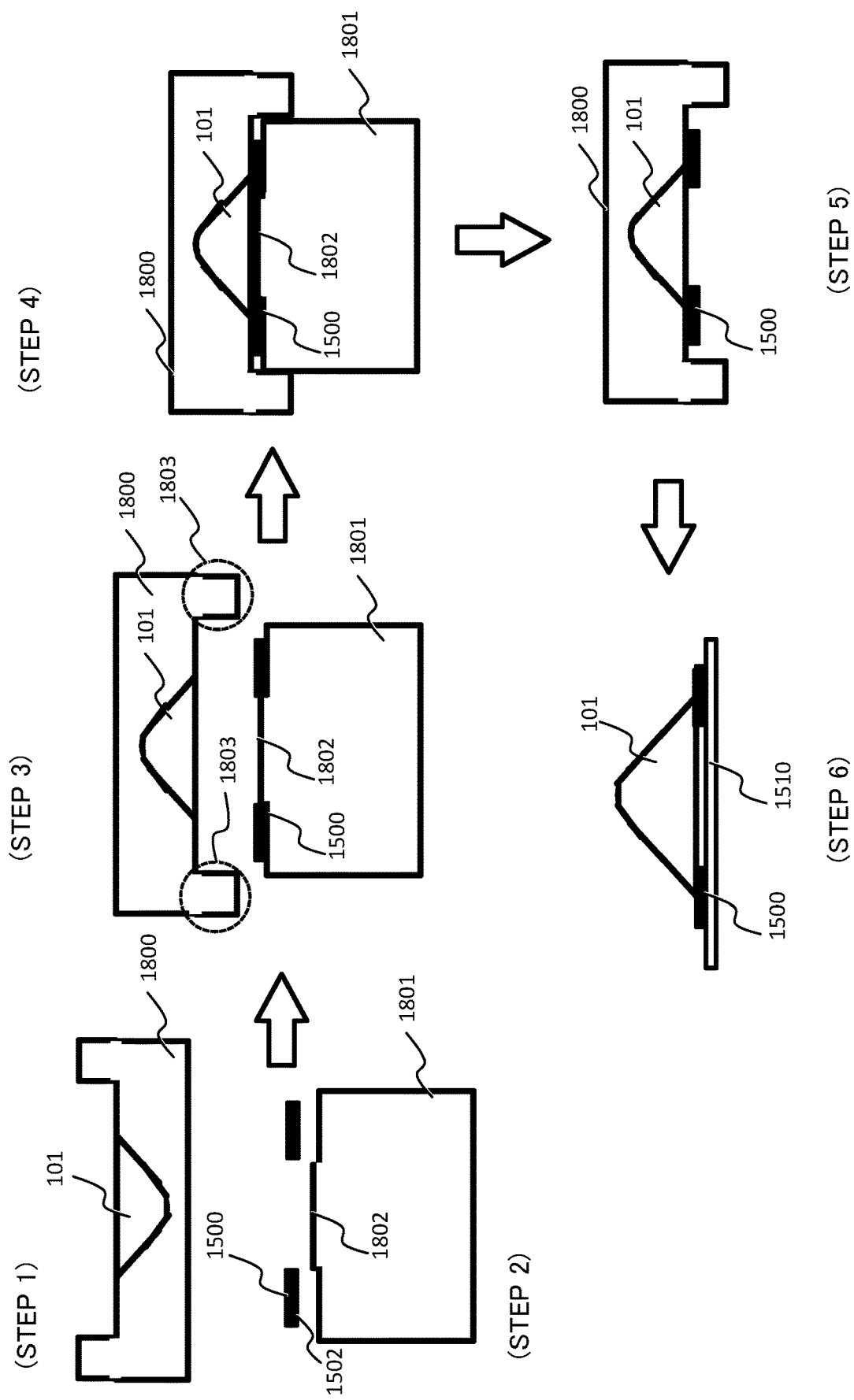
FIG. 18 is a diagram illustrating another example of the method of attaching the gel to the assisting member according to the embodiment.

FIG. 18 is a diagram illustrating another example of the method of attaching the gel 101 to the assisting member 1500. In the example illustrated FIG. 18, the gel 101 is attached to the assisting member 1500 in the following procedure, for example.
  Step 1: The pre-gelation liquid is injected into a mold 1800 for the gel 101, and is cured under gel curing conditions to form the gel 101.
  Step 2: The assisting member 1500 is disposed on a jig 1801.
  Step 3: After the curing of the gel, the gel mold 1800 is inverted. In addition, the jig 1801 may have a convex portion 1802 having the same outer diameter as that of the tip portion 1600 of the objective. Thus, the assisting member 1500 can be aligned with the outer diameter of the jig 1801 by fitting the opening portion 1503 of the assisting member 1500 to the convex portion 1802.
  Step 4: The assisting member 1500 and the jig 1801 are placed on the mold 1800 for the gel 101. The mold 1800 may have a convex portion 1803. Thus, by fitting the jig 1801 to the convex portion 1803 of the gel mold 1800, the assisting member 1500 can be aligned with the gel 101 and the gel 101 can be attached to the assisting member 1500.
  Step 5: The jig 1801 is removed from the mold 1800 for the gel 101.
  Step 6: The mold 1800 is removed. The protective member 1510 is attached to the assisting member 1500. By attaching the protective member 1510 to the assisting member 1500, the adhesive force of the assisting member 1500 can be protected.

When the adhesive force of the second surface 1502 of the assisting member 1500 is too strong, the jig 1801 may not be removed from the mold 1800 for the gel 101 in Step 5. Therefore, for example, the adhesive force may be improved by attaching a double-sided tape or the like after the mold 1800 is removed in Step 6. Alternatively, the shape of the protective member 1510 of the assisting member 1500 may be made annular and substantially the same as the shape of the second surface of the assisting member 1500, and the assisting member 1500 may be attached to the protective member 1510 before the assisting member 1500 is disposed on the jig 1801 in Step 2, and the step may proceed. In this case, the operation of attaching the protective member 1510 in Step 6 is not performed.

When the adhesive force of the second surface 1502 of the assisting member 1500 is weak, there is a possibility that the assisting member 1500 is easily removed from the jig 1801 and the operation may be difficult. Therefore, in order to facilitate the adhesion work and the removal work, an electrically peelable adhesive tape can be used as an example.

The electrically peelable adhesive tape is, for example, a tape having an adhesive force, and has a property capable of reducing the adhesive force by applying a voltage to facilitate peeling. In one example, an electrically peelable adhesive tape made by VIGteQnos Corporation can be utilized. For example, in Step 2, the assisting member 1500 is disposed on the jig 1801 such that the electrically peelable adhesive tape is disposed between the jig 1801 and the assisting member 1500. As a result, the assisting member 1500 can be attached to the jig 1801 with the electrically peelable adhesive tape, and the assisting member 1500 can be stably held by the jig 1801.

To remove the jig 1801 from the mold 1800 for the gel 101 in Step 5, a voltage is applied to the electrically peelable adhesive tape to reduce the adhesive force, so that the assisting member 1500 is easily peeled off from the electrically peelable adhesive tape. Therefore, the jig 1801 can be easily removed.

Figure 19:
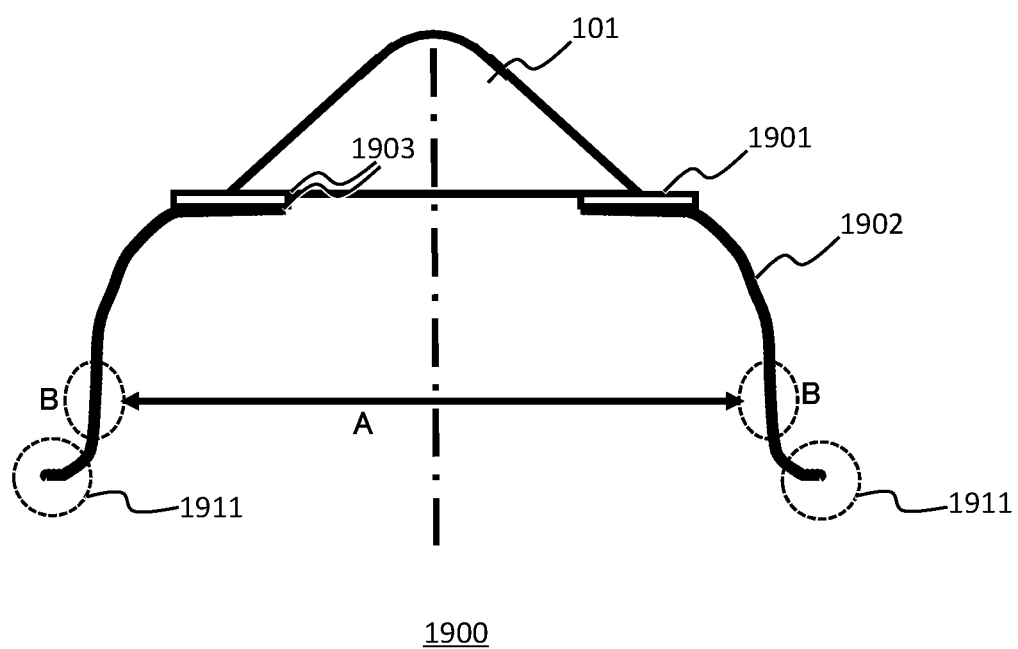
FIG. 19 is a diagram illustrating an assisting member including a plurality of members according to the embodiment.

Subsequently, an assisting member 1900 including a plurality of members will be exemplified. FIG. 19 is a diagram illustrating the assisting member 1900 including the plurality of members according to the embodiment. In the example illustrated in FIG. 19, the assisting member 1900 includes the first member 1901 and the second member 1902.

The first member 1901 is formed of, for example, a material such as metal, resin, rubber, or an adhesive sheet. The first member 1901 may have, for example, an annular sheet shape, and has an opening portion 1903 having a thickness of 0.2 mm, an outer diameter of Φ 12 mm, and an inner diameter of Φ 7 mm. In one example, the first member 1901 may have features similar to those of the assisting member 1500. The first member 1901 has a first surface to be brought into close contact with the gel 101.

The second member 1902 is made of an elastic material such as urethane rubber. The second member 1902 is a second surface (for example, the back surface) facing (opposite to) the first surface and disposed on the side on which an objective is arranged. Further, a part of the second member extends, for example, in the optical axis direction of the objective so as to cover the frame member of the objective. The second member 1902 has, for example, an opening portion 1903 having an inner diameter of Φ 7 mm. In one example, the second member 1902 may have features similar to those of the assisting member 1100.

At least one of the third surface (surface (for example, the back surface) facing (opposite to) the first surface) of the first member 1901 and the fourth surface (surface (for example, the back surface) facing (opposite to) the second surface) of the second member 1902 may have adhesion, and the first member 1901 and the second member 1902 are in close contact with each other at the third surface and the fourth surface. The first member 1901 is, for example, a member harder than the second member 1902.

In addition, the second member 1902 includes a fixing portion (portion indicated by B in FIG. 19) having a structure to which an elastic force for fixing to the objective is applied. The inner diameter A of the fixing portion may be smaller than the outer diameter of the side surface of the objective, for example. For example, when the outer diameter of the side surface of the objective is 16 mm, the inner diameter A of the fixing portion may be 15.8 mm.

The second member 1902 includes a flange 1911 for easy gripping. Therefore, the user can increase the inner diameter of the second member 1902 by the elasticity of the rubber by pulling the flange 1911, and the fixing portion having the inner diameter smaller than the outer diameter of the side surface of the objective can be temporarily expanded and drawn into the side surface of the objective. After that, by releasing the flange, the second member 1902 can be attached and fixed to the objective by an elastic force.

FIGS. 20A and 20B are diagrams illustrating the attachment of the assisting member 1900 to the objective according to the embodiment. FIG. 20A illustrates a tip portion 2000 of the objective. The tip portion 2000 includes a tip lens 2001, a lens support frame 2002, and a tip outer frame 2003. An outer diameter of a surface 2005 of the tip frame of the tip outer frame 2003 is, for example, 12 mm.

FIG. 20B is a diagram illustrating the attachment of the assisting member 1900 to the tip portion 2000 of the objective. As illustrated in FIG. 20B, by bonding the first member 1901 and the second member 1902, the gel 101 can be disposed on the objective when the second member 1902 is attached to the objective.

The attachment of the gel 101 to the assisting member 1900 according to the embodiment can be similarly performed by using the assisting member 1900 instead of the assisting member 1100 in the procedure described with reference to FIG. 13 or 14, for example. Alternatively, in another embodiment, the gel 101 is attached to the first member 1901 using the first member 1901 instead of the assisting member 1500 in the procedure described with reference to FIG. 17. Thereafter, the first member 1901 and the second member 1902 may be brought into close contact with each other to form the assisting member 1900.

Next, attachment positions of the assisting member and the gel 101 will be described. It is preferable that, at the position where the gel 101 is attached to the assisting member, for example, an outer periphery of a surface of the gel 101 where the gel 101 and the assisting member are in close contact with each other is disposed outside the opening portion of the assisting member. When the outer periphery of the gel 101 overlaps the opening, the adhesive force of the portion decreases, and the gel 101 is easily detached from the assisting member. For example, when the objective is moved due to switching of the objective, a change in the observation position, or the like, if a part of the outer periphery of the bottom surface of the gel 101 is not in close contact with the assisting member, the gel may easily peel off. In this case, the gel may be easily peeled off unless the gel on the side opposite to the moving direction is in close contact with the assisting member. Therefore, in one embodiment, the gel 101 is disposed on the assisting member such that the outer periphery of the surface of the gel 101 where the gel 101 and the assisting member are in close contact with each other is disposed outside the opening portion of the assisting member.

FIGS. 21A to 21D are diagrams illustrating arrangement of the gel 101 on the assisting member. In FIGS. 21A to 21D, a shaded region 2100 indicates a region where the gel 101 and the assisting member are in close contact with each other. For example, in FIG. 21A, a part of the outer periphery of the bottom surface of the gel 101 is inside the opening portion of the assisting member, and is not in close contact with the assisting member. In this case, for example, the resistance to the force applied by the movement of the objective or the like may decrease, and the gel 101 may peel off from the assisting member. On the other hand, in FIG. 21B, the outer periphery of the surface of the gel 101 where the gel 101 and the assisting member are in close contact with each other is disposed outside the opening portion of the assisting member. Therefore, stability against the force applied by the movement of the objective is high. A deviation between the center of the surface of the gel 101 where the gel 101 is in close contact with the assisting member and the center of the assisting member is preferably within a predetermined allowable range (for example, 1 mm or less).

Figure 21A:
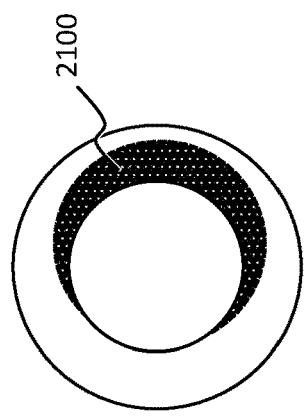
FIGS. 21A to 21D are diagrams illustrating arrangement of the gel on the assisting member.
Figure 21B:
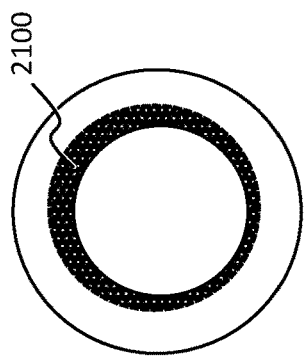
Figure 21C:
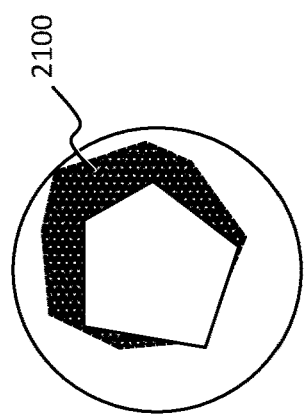
Figure 21D:
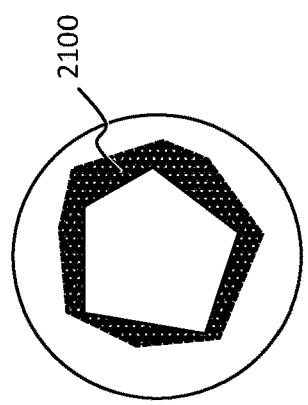

In addition, the shape of the gel 101 can vary. For example, as illustrated in FIGS. 21C and 21D, the bottom surface of the gel 101 may be polygonal. Even in such a case, the gel 101 is preferably attached to the assisting member such that the bottom surface of the gel 101 is disposed outside the opening portion of the assisting member. For example, in FIG. 21C, a part of the outer periphery of the bottom surface of the gel 101 is inside the opening portion, and the adhesive force is low. On the other hand, in FIG. 21D, for example, the outer periphery of the surface of the gel 101 where the gel 101 and the assisting member are in close contact with each other is disposed outside the opening portion of the assisting member. Therefore, stability against the force applied by the movement of the objective is high. The same applies to a case where the shape of the gel 101 or the shape of the opening portion of the assisting member is complex or different.

In addition, in the above-described embodiment, the attachment of the assisting members to the gel 101 may be controlled by, for example, a computer.

Figure 22A:
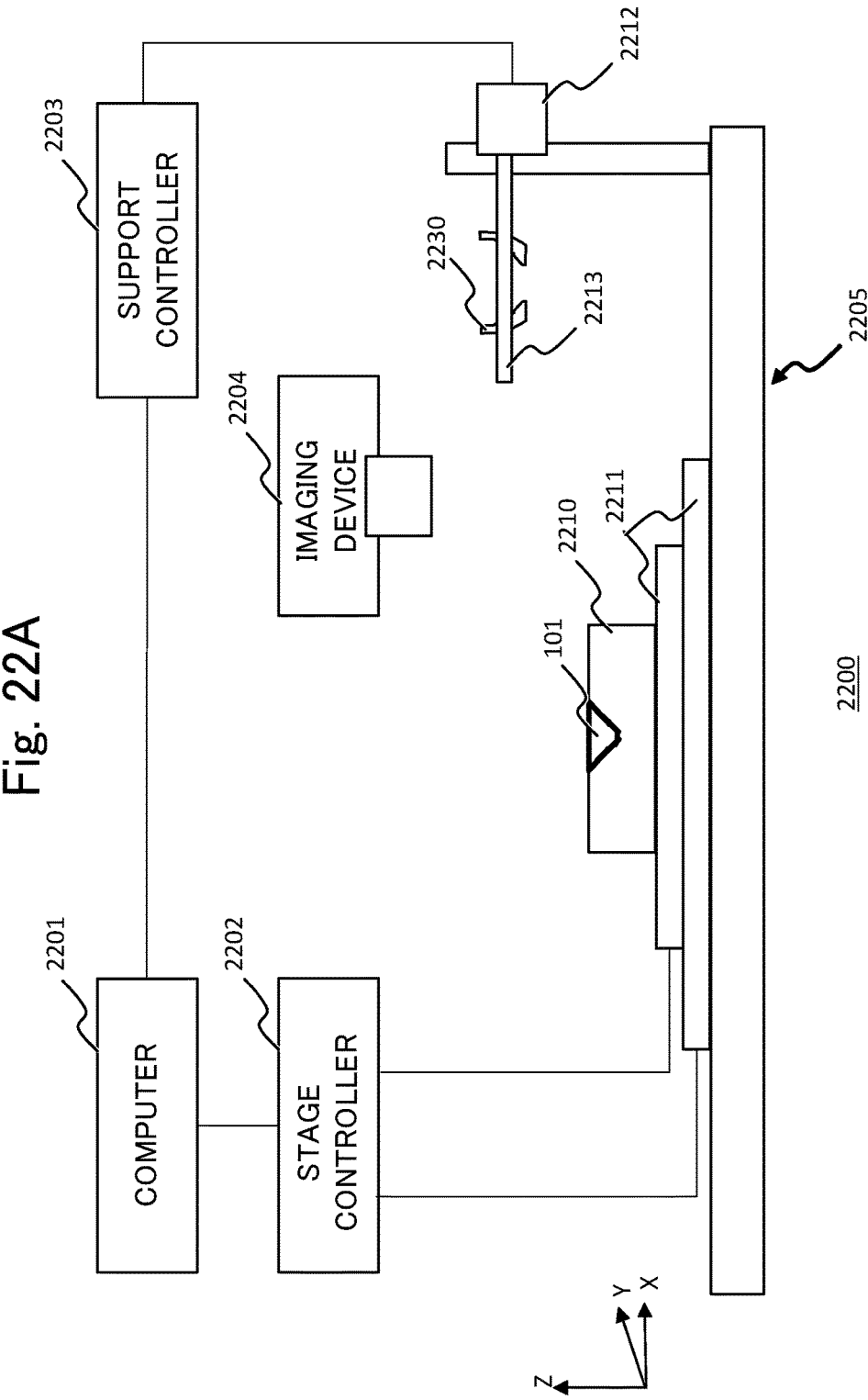
FIGS. 22A and 22B are diagrams illustrating an attachment system that attaches an assisting member to the gel according to the embodiment.
Figure 22B:
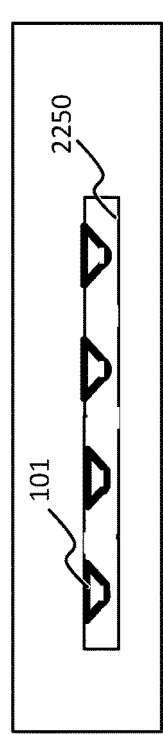

FIGS. 22A and 22B are diagrams illustrating an attachment system 2200 that attaches an assisting member to the gel 101 according to the embodiment. The attachment system 2200 illustrated in FIG. 22A includes, for example, a computer 2201, a stage controller 2202, a support controller 2203, an imaging device 2204, and an attachment device 2205. The attachment device 2205 is, for example, an actuator.

The computer 2201 is an information processing device having a calculation function of processing information, such as a server computer, a personal computer (PC), a mobile PC, or a tablet terminal.

The attachment device 2205 includes, for example, a stage 2211 for moving, in the X direction and the Y direction, an arrangement member 2210 placed on the stage 2211 and having the gel 101 arranged thereon, and an electric support 2212 for moving an assisting member 2230 in the Z direction. The electric support 2212 includes a holder 2213 for holding the assisting member 2230. In one example, the arrangement member 2210 may be a mold used for producing the gel 101.

The stage 2211 moves the arrangement member 2210 in the X direction under the control of the stage controller 2202, for example. The stage 2211 moves the arrangement member 2210 in the Y direction under the control of the stage controller 2202, for example. The electric support 2212 moves the holder 2213 in the Z direction under the control of the support controller 2203, for example.

For example, the computer 2201 transmits a control signal to the stage controller 2202 to move the arrangement member 2210 on which the gel 101 placed on the stage 2211 is arranged in the X direction and the Y direction. For example, the computer 2201 transmits a control signal to the support controller 2203 to move the holder 2213 in the Z direction.

For example, the computer 2201 determines the movement position of the attachment device 2205 such that the center of the opening of the assisting member 2230 is located on the central axis of the gel 101 disposed on the arrangement member 2210, and performs control to cause the attachment device 2205 to press the assisting member 2230 against the gel 101 at a determined position.

Therefore, it is possible to attach the gel 101 to the assisting member 2230 using the attachment system 2200. First, for example, the arrangement member 2210 on which the gel 101 is arranged is fixed to the stage 2211. Note that the distance from the edge portion of the arrangement member 2210 on which the gel 101 is arranged to a predetermined position of the outer periphery of the gel 101 is measured in advance. Further, the assisting member 2230 is attached to the holder 2213 of the electric support 2212.

For example, the computer 2201 transmits a control signal to the stage controller 2202 and the support controller 2203, and uses the stage 2211 to move the arrangement member 2210 on which the gel 101 is arranged to a predetermined position where the arrangement member 2210 on which the gel 101 is arranged is docked to the assisting member 2230. Note that slight positional deviation may occur when the arrangement member 2210 is placed on the stage 2211 and when the assisting member 2230 is attached to the holder 2213 of the electric support 2212. As a result, the arrangement may be obtained with positional accuracy insufficient for docking the gel 101 to the assisting member 2230.

Therefore, the computer 2201 transmits a control signal to the support controller 2203 so as to lower the position of the assisting member 2230 in the Z direction to the closest position to the arrangement member 2210 where the assisting member 2230 is not brought into contact with the arrangement member 2210.

For example, the computer 2201 checks, from an image captured by the imaging device 2204, the positions (X1, Y1) of a predetermined edge of the arrangement member 2210 with the gel 101 arranged thereon in the X-axis direction and the Y-axis direction and the positions (X2, Y2) of a predetermined outer portion of the assisting member 2230 in the X-direction and the Y-direction.

Then, the computer 2201 calculates X=X1−X2 and Y=Y1−Y2, and moves the arrangement member 2210 on the stage 2211 by amounts X0−X and Y0−Y that do not match difference values (X0, Y0) between the positions of the edge of the arrangement member 2210 and the positions of the outer portion of the assisting member 2230. Finally, the computer 2201 transmits a control signal to the electric support 2212 to lower the assisting member 2230 in the Z direction and bring the assisting member 2230 into contact with the gel 101. Thereafter, the computer 2201 transmits a control signal to the electric support 2212 to raise the assisting member 2230 in the Z direction. Thereby, the gel 101 can be brought into close contact with the assisting member 2230 at an appropriate position and taken out from the arrangement member 2210.

A mold 2250 in which a plurality of gels 101 are formed may be used to attach the gels 101 to the assisting member 2230 using the attachment system 2200. FIG. 22B is a diagram illustrating the mold 2250 in which the plurality of gels 101 are formed. In FIG. 22B, the plurality of gels 101 are formed at equal intervals in the mold 2250. Also in this case, the position of a predetermined edge of the mold 2250 and the position of an outer periphery of each gel 101 included in the mold 2250 are measured and specified in advance. Thereby, the gels 101 can be brought into close contact with the assisting member 2230 at an appropriate position using the attachment system 2200.

Note that, in the above-described embodiment, for example, the lens support frame 602, the barrel 803, the tip outer frame 1003, the tip outer frame 1203, the tip outer frame 1603, and the tip outer frame 2003 are examples of a frame members of an objective.

In addition, in the above-described embodiment, an assisting member to which the gel 101 is attached may be referred to as a gel unit, for example. The gel unit is used, for example, to attach the gel 101 to an objective included in an optical signal detection device. The gel unit is arranged to fill a space between the objective and the holding member, for example. In a state where the gel unit is attached to the frame member of the objective, for example, the second surface of the assisting member faces the frame member of the objective, a part of the first surface of the assisting member is fixed to the gel 101 outside the effective diameter of the objective, and the gel 101 is in close contact with the objective.

In addition, as exemplified in the above-described embodiment, for example, in a state where the gel unit is attached to the frame member, a part of the assisting member extends in the optical axis direction of the objective so as to cover the frame member of the objective. For example, a part of the assisting member extends in an annular shape in a direction opposite to the gel 101.

Further, as exemplified in the above-described embodiment, the assisting member is shaped in the same shape as that of an outer shape (for example, the outer periphery) of at least a part of the frame member, for example. The assisting member may have a shape slightly smaller than the outer periphery of the frame member, for example, in a case where the assisting member is an elastic body.

In addition, as exemplified in the above-described embodiment, in one example, the assisting member may include a structure dynamically attached to the frame member, and the structure fixes the assisting member to the frame member. Examples of the structure include a screw groove, a hook, a hook-and-loop fastener, and the like. For example, the part of the assisting member extending in the annular shape includes a dynamically attachable structure such as a screw groove, a hook, and a hook-and-loop fastener.

In addition, as exemplified in the above-described embodiment, in one example, a part of the second surface facing the first surface may have an adhesive force. The part of the second surface facing the first surface is, for example, a portion having a surface facing the first surface, such as a back surface of the first surface. For example, the assisting member is fixed to the frame member by the adhesive force of this portion. In addition, the part of the assisting member extending in the annular shape may have, for example, an elastic force.

Although the embodiment has been exemplified above, the embodiment is not limited thereto. For example, the above-described procedures are examples, and the embodiment is not limited thereto. If possible, the procedures may be performed in a changed order, and further procedures may be included separately, or some procedures may be omitted. For example, in the attachment of the gel 101 to the assisting member described above, the gel 101 may be cured before the assisting member is brought into contact with the gel 101, or the gel 101 may be cured after the assisting member is brought into contact with the gel 101.

Figure 23:
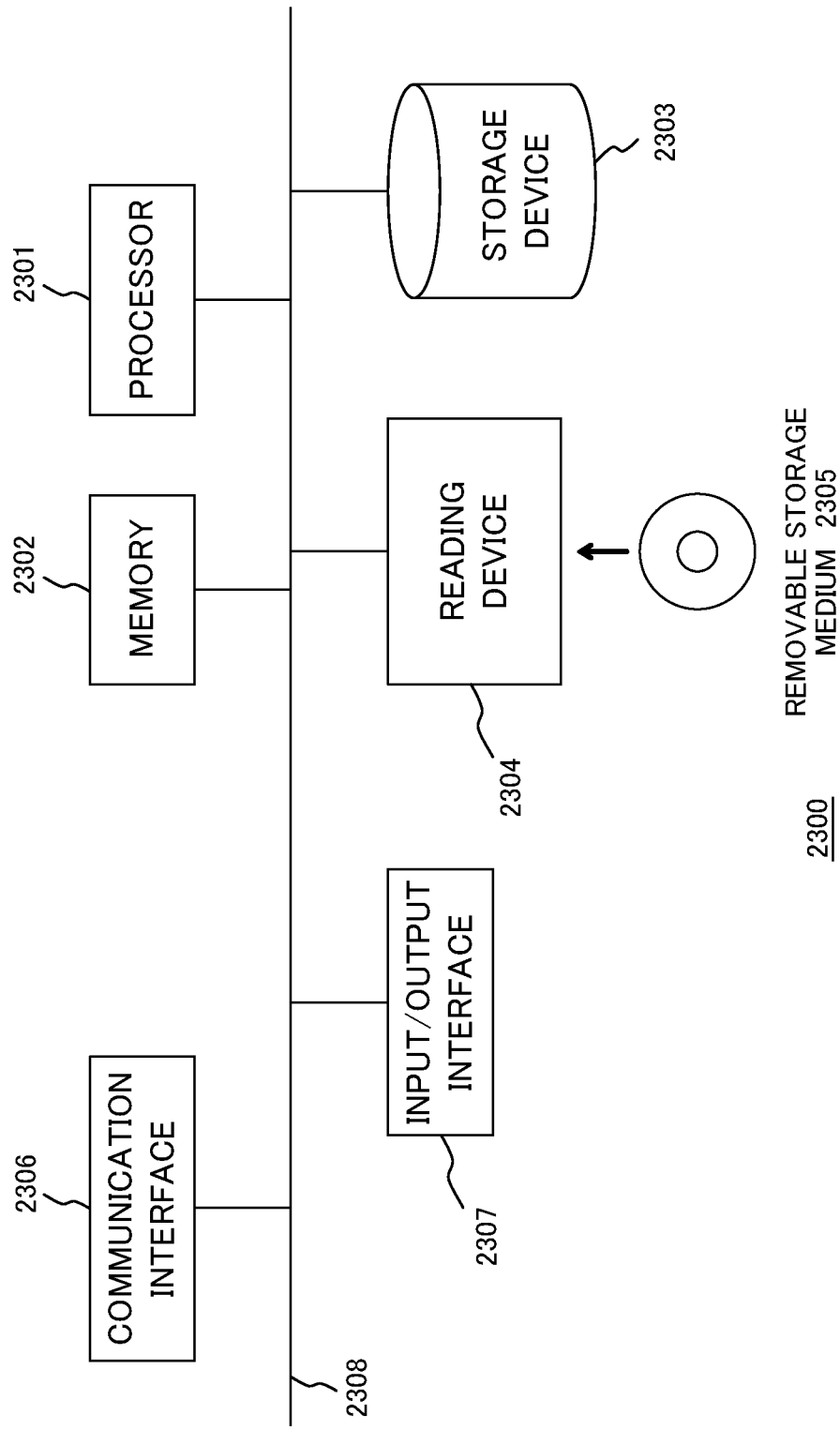
FIG. 23 is a diagram illustrating a hardware configuration of a computer according to the embodiment.

FIG. 23 is a diagram illustrating a hardware configuration of the computer 2201 according to the embodiment. The hardware configuration for implementing the computer 2201 illustrated in FIG. 23 includes, for example, a processor 2301, a memory 2302, a storage device 2303, a reading device 2304, a communication interface 2306, and an input/output interface 2307. Note that the processor 2301, the memory 2302, the storage device 2303, the reading device 2304, the communication interface 2306, and the input/output interface 2307 are connected to one another, for example, via a bus 2308.

The processor 2301 may be, for example, a single processor, a multiprocessor, or a multi-core processor. The processor 2301 provides some or all of the functions of the computer 2201 described above, for example, by executing a program describing the above-described procedures using the memory 2302. For example, the processor 2301 controls the stage controller 2202 and the support controller 2203 by reading and executing a program stored in the storage device 2303.

For example, the memory 2302 is a semiconductor memory, and may include a RAM area and a ROM area. For example, the storage device 2303 is a hard disk, a semiconductor memory such as a flash memory, or an external storage device. RAM is an abbreviation for Random Access Memory. ROM is an abbreviation for Read Only Memory.

The reading device 2304 accesses a removable storage medium 2305 according to an instruction of the processor 2301. For example, the removable storage medium 2305 is implemented by a semiconductor device, a medium to and from which information is input and output by a magnetic effect, a medium to and from which information is input and output by an optical effect, or the like. Note that the semiconductor device is, for example, a Universal Serial Bus (USB) memory. Furthermore, the medium to which information is input and output by the magnetic effect is, for example, a magnetic disk. The medium to which information is input and output by the optical effect is, for example, a CD-ROM, a DVD, a Blu-ray Disc, or the like (Blu-ray is a registered trademark). CD is an abbreviation for Compact Disc. DVD is an abbreviation for Digital Versatile Disk.

The communication interface 2306 communicates with other devices according to an instruction of the processor 2301. The communication interface 2306 transmits a control signal to the stage controller 2202 and the support controller 2203, for example, according to an instruction of the processor 2301.

The input/output interface 2307 may be, for example, an interface between an input device and an output device. The input device is, for example, a device such as a keyboard, a mouse, or a touch panel that receives an instruction from the user. The output device is, for example, a display device, such as a display, or a sound device, such as a speaker.

Figure 24:
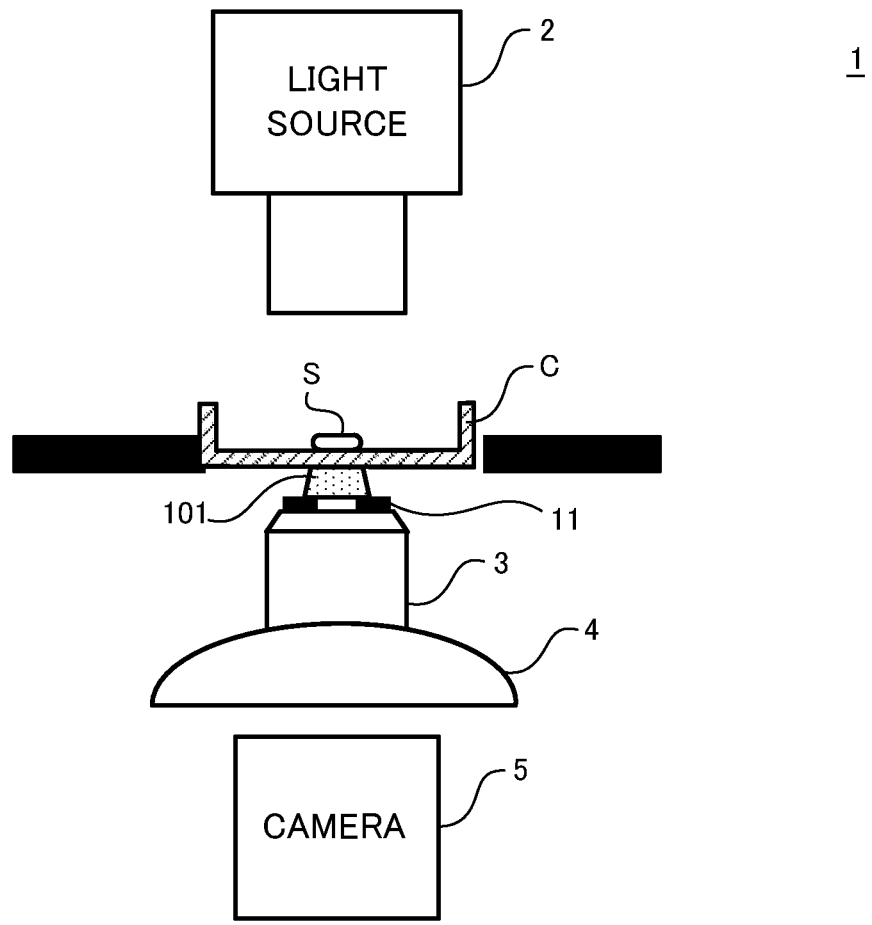
FIG. 24 is a diagram illustrating a configuration of a microscope apparatus according to an embodiment.

FIG. 24 is a diagram illustrating a configuration of a microscope apparatus 1 according to an embodiment. The microscope apparatus 1 illustrated in FIG. 24 is an inverted microscope for observing a sample S from below, and is an example of the optical signal detection device that detects an optical signal. As illustrated in FIG. 24, the microscope apparatus 1 includes a light source 2, an objective 3 attached to a revolver 4, and a camera 5. The objective 3 is a so-called immersion objective that is used in a state where a space between the objective 3 and a container is filled with an immersion liquid. In addition, the objective 3 may be, for example, an objective specially designed for applying a gel. The container C for storing the sample S is, for example, a glass bottom dish or the like, and is an example of the holding member for holding the sample S. The sample S is not particularly limited, but is, for example, a biological sample such as a cell. The sample S may be a sample having a thickness of several hundred μm, such as a spheroid or an organoid three-dimensionally cultured.

Note that, although FIG. 24 illustrates an example in which the microscope apparatus 1 is an inverted microscope, the microscope apparatus 1 may be an upright microscope. In this case, the gel 101 may fill a space between cover glass, which is another example of the sample holding member, and the objective 3.

The microscope apparatus 1 irradiates the sample S with light from the light source 2, and detects the light from the sample S with the camera 5 to acquire an image of the sample S. The observation method of the microscope apparatus 1 is not particularly limited. For example, the image of the sample S may be acquired by a bright field observation method, or may be acquired by a fluorescence observation method. The observation method may be other observation methods, such as a phase contrast observation method and a differential interference contrast observation method.

The microscope apparatus 1 includes a gel 101 having a refractive index higher than that of air instead of the immersion liquid as a liquid, and an assisting member 11 for disposing the gel 101 between the immersion objective 3 and the container C.

Unlike the immersion liquid, the gel 101 does not have fluidity. Therefore, as compared with the immersion liquid held between the objective 3 and the container C using surface tension, the gel 101 can be easily disposed in an observation optical path between the objective 3 and the container C using the assisting member 11, and the operation of removing the gel from the observation optical path is also easy. Therefore, even when the immersion objective and the dry objective are switched and used, the switching operation can be quickly performed. In addition, the gel 101 having no fluidity does not flow down from the objective 3 during observation, unlike the immersion liquid. Therefore, the objective 3 and the periphery thereof are not contaminated, and thus cleaning after use is easy. In addition, since the gel 101 does not extremely decrease in volume due to evaporation, there is no need to additionally supply a gel during observation unlike immersion, and it is possible to easily cope with long-time observation. Furthermore, since the gel 101 has relatively high adhesiveness, it can be stably present between the objective 3 and the container C even during the time when the sample is observed obliquely or sideways. As such, the gel 101 is much easier to handle compared to immersion. In addition, by handling the gel 101 as a gel unit using the assisting member 11, it is possible to greatly reduce the burden on the user due to the use of the immersion objective.

Similarly to the immersion liquid, the gel 101 has a refractive index higher than that of air. Therefore, it is possible to achieve a high numerical aperture by exerting the performance of the immersion objective 3, and it is possible to obtain a bright image with high resolution. In addition, a difference in refractive index between the container C and the sample S is also smaller than that in a case where air is interposed. Therefore, similarly to the case of using the immersion liquid, it is possible to observe the sample S to a deep portion of the sample S while suppressing the spherical aberration caused by the difference in refractive index between the container C and the sample S. Therefore, the three-dimensional structure of the sample can be favorably observed by using the gel 101.

As described above, according to the microscope apparatus 1 that performs observation using the gel 101 and the assisting member 11, it is possible to satisfactorily observe the sample S without imposing an excessive burden on the user even in the case of using the immersion objective 3. In addition, since the dry objective and the immersion objective can be smoothly switched, it is possible to efficiently perform the observation while suppressing the interruption of the observation accompanying the switching between the objectives in a short time.

By using the assisting member 11 to dispose the gel 101 in the microscope apparatus 1 handled, the handling is facilitated, and the gel 101 can be easily attached to the objective. As a result, for example, the gel can be prevented from being damaged during the handling as compared with a method in which the gel is directly touched with tweezers or the like and attached.

Hitherto, the bottom surface of the gel 101 has been exemplified as a flat surface, but various advantages can be obtained by devising the shape of the bottom surface.

Figure 25B:
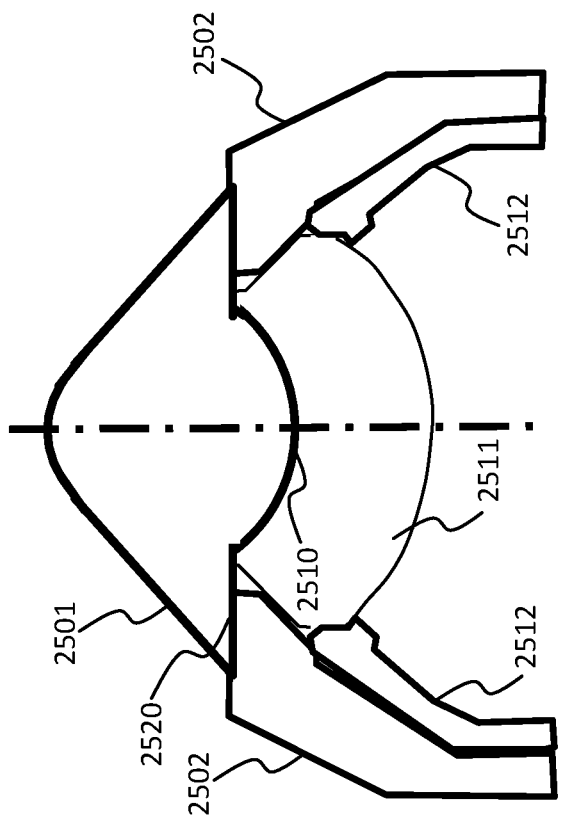
FIGS. 25A and 25B are other diagrams illustrating a gel according to an embodiment.
Figure 25A:
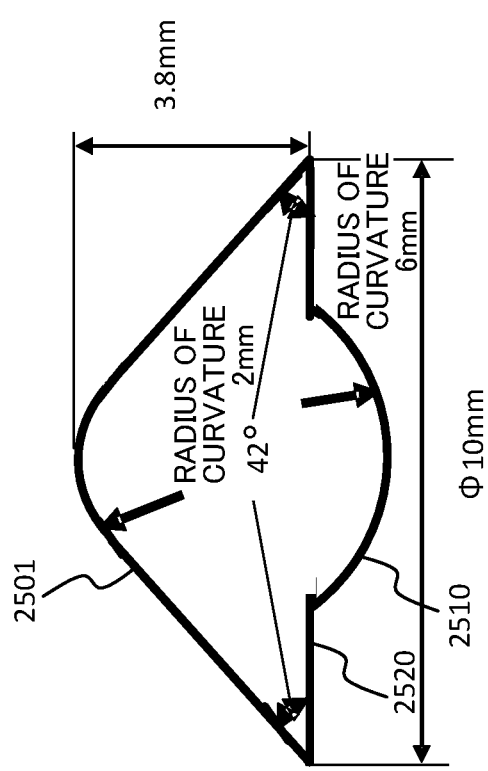

Other shapes of the gel 101 will be exemplified below. FIGS. 25A and 25B illustrate a gel 2501 in which a bottom surface 2520 (an outer edge region of the gel 101) has a convex surface 2510 (the center of the bottom surface of the gel 101) according to an embodiment. In the gel 2501 illustrated in FIG. 25A, the convex surface 2510 having a radius of curvature of 6 mm is added to the bottom surface 2520 as compared with the gel 101 illustrated in FIG. 1A. In addition, in FIG. 25B, an assisting member 2502 to which the gel 2501 is attached is attached to a tip portion of an objective. The tip portion of the objective includes a tip lens 2511 and a lens support frame 2512.

When the objective has a concave surface at a position where the height of light is low, the concave surface having a small radius of curvature can be arranged without weakening the positive power of the entire lens, so that the Petzval sum can be brought closer from positive to 0 to correct the field curvature. The height of light that passes through the tip of the objective is low as compared with other positions in the objective, and thus it is easy to provide the concave surface having a small radius of curvature. However, a normal immersion objective has a problem that a liquid enters a concave surface and the normal immersion objective cannot be cleaned. Therefore, the normal immersion objective cannot have a concave surface at its tip. However, when the gel 101 has the same shape as that of the gel 2501, the tip of the objective can have a concave shape.

The bottom surface 2520 of the gel 2501 is in close contact with the assisting member 2502. Since the radius of curvature of the convex surface 2510 of the bottom surface 2520 of the gel 2501 is small, the close contact portion of the bottom surface 2520 of the gel 2501 with the assisting member 2502 is deformed in accordance with the shape of the assisting member 2502.

Figure 26B:
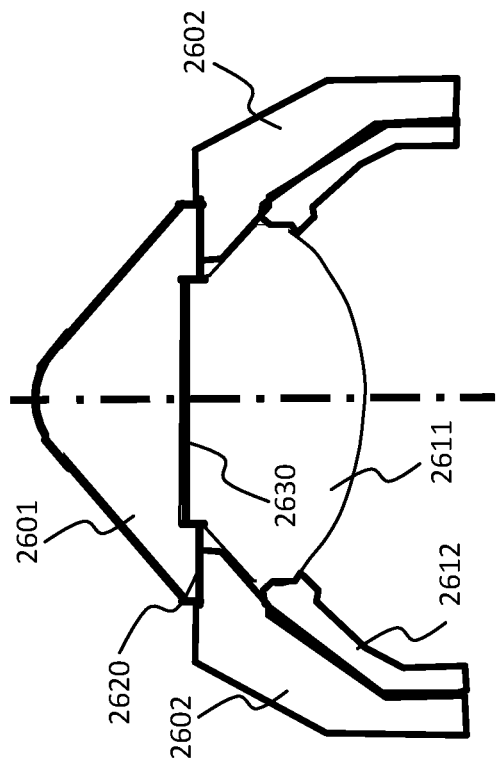
FIGS. 26A and 26B are other diagrams illustrating a gel according to an embodiment.
Figure 26A:
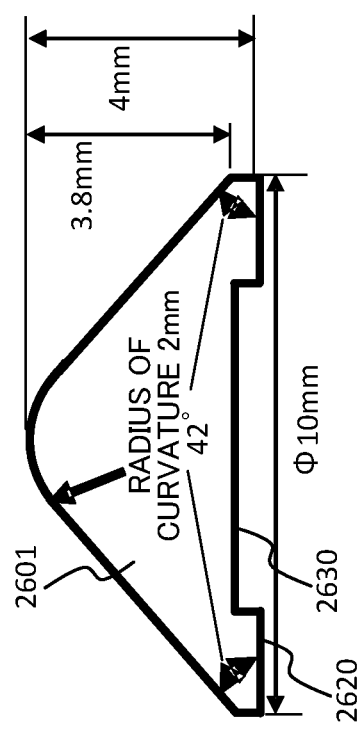

FIGS. 26A and 26B illustrate a gel 2601 in which a bottom surface 2620 (the outer edge region of the gel 101) has a concave surface 2630 (the center of the bottom surface of the gel 101) according to an embodiment. In the gel 2601 illustrated in FIG. 26A, as compared with the gel 101 illustrated in FIG. 1A, the concave surface 2630 having a step is added to the bottom surface 2620, and the bottom surface 2620 of the gel 2601 has an annular column shape having an outer diameter of Φ 10 mm, a width of 1.5 mm, and a height of 0.2 mm. In addition, in FIG. 26B, the assisting member 2602 to which the gel 2601 is attached is attached to a tip portion of an objective. The tip portion of the objective includes a tip lens 2611 and a lens support frame 2612.

According to the gel 2601, as illustrated in FIG. 26B, the concave surface 2630 with the step of the gel 2601 can be fitted into a convex portion or the like of the tip lens 2611 of the objective, and the gel 2601 is hardly displaced when the holding member (sample) moves in the lateral direction (for example, the X direction and the Y direction). However, for example, when the height of the step is too large, it is difficult to attach and detach the gel 2601. Therefore, for example, it is desirable that the height of the step be set to 1 mm or less and the bottom surface of the gel 2601 be substantially flat.

Figure 27B:
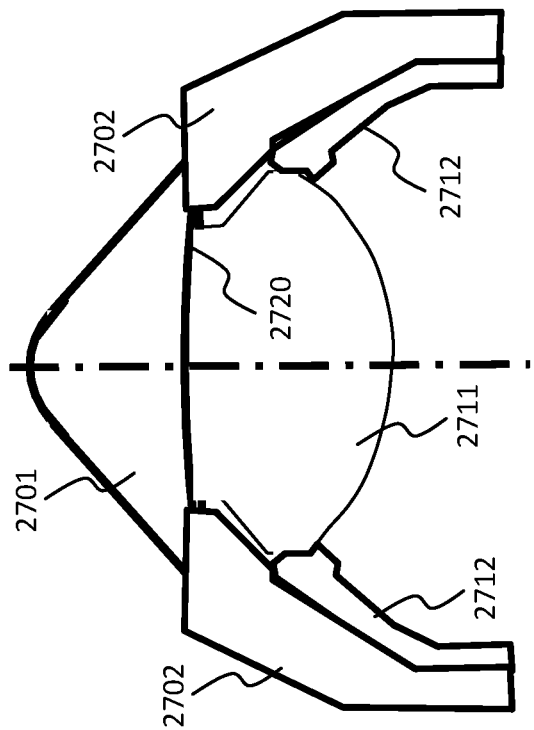
FIGS. 27A and 27B are other diagrams illustrating a gel according to an embodiment.
Figure 27A:
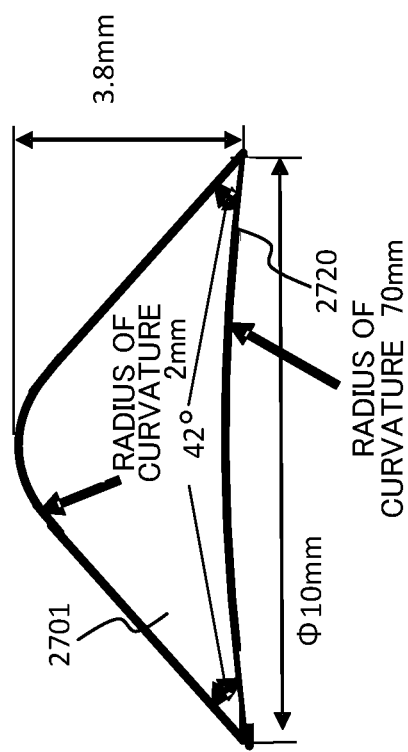

FIGS. 27A and 27B illustrate a gel 2701 in which a bottom surface 2720 (corresponding to the center of the bottom surface of the gel 101 and the outer edge region of the gel 101) is a spherical concave surface according to an embodiment. In the gel 2701 illustrated in FIG. 27A, the bottom surface 2720 is spherical (with a radius of curvature of 70 mm) as compared with the gel 101 illustrated in FIG. 1A. In addition, in FIG. 27B, an assisting member 2702 to which the gel 2701 is attached is attached to a tip portion of an objective. The tip portion of the objective includes a tip lens 2711 and a lens support frame 2712.

The radius of curvature of a convex surface of the tip portion of the objective is large. When the radius of curvature decreases, it becomes difficult to correct the field curvature of the objective. Since the radius of curvature is large, the gel 2701 is deformed to have a flat surface to be in close contact with the assisting member 2702 at the close contact portion of the gel 2701 with the assisting member 2702. Therefore, the adhesive force between the gel 2701 and the assisting member 2702 increases, and the gel 2701 is less likely to be separated from the holding member at the time of conversion of the objective or at the time of the movement of the holding member (sample) in the lateral direction (for example, the X direction and the Y direction).

As illustrated in FIGS. 25A to 27B above, the gel may have various shapes. For example, the bottom surface of the gel may be a flat surface, a concave surface, a convex surface, a spherical surface, a stepped surface, or the like. In addition, when the bottom surface of the gel has a slight concave shape, the bottom surface is preferably substantially flat (the difference in height is 1 mm or less).

The embodiments are described above. However, the embodiments are not limited to the above-described embodiments, and should be understood as including various modifications and alternative embodiments of the above-described embodiments. For example, it will be understood that various embodiments can be embodied by modifying components without departing from the spirit and scope thereof. In addition, it will be understood that various embodiments can be implemented by appropriately combining a plurality of components disclosed in the above-described embodiments. Furthermore, a person skilled in the art may understand that various embodiments may be implemented by removing some components from all the components described in the embodiments or adding some components to the components described in the embodiments.

What is claimed is:

1. An optical signal detection device comprising:
an objective; and
a gel unit including a gel and an assisting member, wherein
the assisting member includes a first surface, a second surface, and an opening,
the opening has a diameter smaller than an outer diameter of the gel and larger than an effective diameter of the objective,
the first surface faces the gel,
a part of the first surface is fixed to a bottom surface of the gel by an adhesive force,
a center of the bottom surface is not in contact with the assisting member, and
in a state where the gel unit is attached to a frame member of the objective, the second surface faces the frame member of the objective, a part of the first surface is fixed to the gel outside the effective diameter of the objective, and the gel is in close contact with the objective.

2. The optical signal detection device according to claim 1, wherein in a state where the gel unit is attached to the frame member, a part of the assisting member extends in an optical axis direction of the objective so as to cover the frame member of the objective.

3. The optical signal detection device according to claim 2, wherein
the assisting member has an elastic force, and
the assisting member is fixed to the frame member by a force that returns the assisting member from elastic deformation caused by the elastic force.

4. The optical signal detection device according to claim 1, wherein
the second surface of the assisting member is shaped in the same shape as that of an outer periphery of the frame member.

5. The optical signal detection device according to claim 2, wherein
the assisting member includes a structure dynamically attached to the frame member, and
the assisting member is fixed to the frame member by the structure.

6. The optical signal detection device according to claim 2, wherein
a part of the second surface having a surface facing the first surface has an adhesive force, and
the assisting member is fixed to the frame member by the adhesive force.

7. The optical signal detection device according to claim 1, wherein
the assisting member has a sheet shape,
the second surface has a surface facing the first surface, and
the second surface is fixed to the frame member by the adhesive force.

8. The optical signal detection device according to claim 1, wherein
an outer periphery of a surface of the gel where the gel is in close contact with the assisting member is disposed outside the opening.

9. The optical signal detection device according to claim 1, wherein
the assisting member includes a first member and a second member,
the first member includes the first surface,
the second member includes the second surface,
the first member has a sheet shape,
a part of the second member extends in an optical axis direction of the objective so as to cover the frame member of the objective, and
the first member is harder than the second member.

10. The optical signal detection device according to claim 1, wherein
a deviation between a center of a surface of the gel where the gel is in close contact with the assisting member and a center of the assisting member is 1 mm or less.

11. The optical signal detection device according to claim 1, further comprising a holding member that holds a sample at a position between the objective and the sample, wherein
the gel unit fills a space between the objective and the holding member.

12. A gel unit for attachment to an objective included in an optical signal detection device, the gel unit comprising a gel and an assisting member, wherein
the assisting member includes a first surface and an opening, the opening has a diameter smaller than an outer diameter of the gel, the first surface faces the gel, a part of the first surface is fixed to a bottom surface of the gel by an adhesive force, and a center of the bottom surface is not in contact with the assisting member.

13. The gel unit according to claim 12, wherein a part of the assisting member extends in an annular shape in a direction opposite to the gel.

14. The gel unit according to claim 13, wherein the part of the assisting member extending in the annular shape has an elastic force.

15. The gel unit according to claim 13, wherein the part of the assisting member extending in the annular shape includes a dynamically attachable structure.

16. The gel unit according to claim 13, wherein a second surface having a surface facing the first surface has the adhesive force.

17. The gel unit according to claim 12, wherein the assisting member has a sheet shape, and a second surface having a surface facing the first surface has the adhesive force.

18. The gel unit according to claim 12, wherein a deviation between a center of a surface of the gel where the gel is in close contact with the assisting member and a center of the assisting member is 1 mm or less.

19. The gel unit according to claim 12, wherein the assisting member includes a first member and a second member, the first member includes the first surface, the first member has a sheet shape, a part of the second member extends in an annular shape in a direction opposite to the gel, and the first member is harder than the second member.

20. A method for manufacturing the gel unit according to claim 12, the method comprising:

a first step of injecting a pre-gelation liquid into a gel mold for curing the gel;

a second step of placing the assisting member on the gel mold;

a third step of curing the pre-gelation liquid to form the gel; and a fourth step of taking out the gel and the assisting member from the gel mold, wherein the steps are performed in the order of the first step, the second step, the third step, and the fourth step.

21. A method for manufacturing the gel unit according to claim 12, the method comprising:

a first step of forming the gel by injecting a pre-gelation liquid and curing the pre-gelation liquid in the gel mold on which the assisting member is placed; and a second step of taking out the gel and the assisting member from the gel mold, wherein the steps are performed in the order of the first step and the second step.

* * * * *